(12) United States Patent
Song et al.

(10) Patent No.: US 11,347,997 B1
(45) Date of Patent: May 31, 2022

(54) SYSTEMS AND METHODS USING ANGLE-BASED STOCHASTIC GRADIENT DESCENT

(71) Applicants: Chongya Song, Miami, FL (US); Alexander Perez-Pons, Miami, FL (US)

(72) Inventors: Chongya Song, Miami, FL (US); Alexander Perez-Pons, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/342,070

(22) Filed: Jun. 8, 2021

(51) Int. Cl.
*G06N 3/04* (2006.01)
*G06F 17/16* (2006.01)
*G06N 3/08* (2006.01)

(52) U.S. Cl.
CPC ........... *G06N 3/0472* (2013.01); *G06F 17/16* (2013.01); *G06N 3/08* (2013.01)

(58) Field of Classification Search
USPC ......................................................... 706/15
See application file for complete search history.

(56) References Cited

U.S. PATENT DOCUMENTS

| | | | |
|---|---|---|---|
| 2018/0247200 A1* | 8/2018 | Rolfe ................... | G06N 3/0445 |
| 2020/0175352 A1* | 6/2020 | Cha ...................... | G06N 3/0454 |
| 2020/0364624 A1* | 11/2020 | Kearney ................. | G06N 3/08 |
| 2020/0380369 A1* | 12/2020 | Case ....................... | G06N 3/084 |

* cited by examiner

*Primary Examiner* — David R Vincent
(74) *Attorney, Agent, or Firm* — Saliwanchik, Lloyd & Eisenschenk

(57) ABSTRACT

Systems and methods for optimizing and/or solving objective functions are provided. Angle-based stochastic gradient descent (AG-SGD) can be used to alleviate pattern deviation (s) not resolved by related art systems and methods. AG-SGD can use the angle between the current gradient (CG) and the previous gradient (PG) to determine the new gradient (NG).

14 Claims, 27 Drawing Sheets

---

AG-SGD

Setting values for $s_g$ and $s_\eta$, where $s_g \geq 1$ and $s_\eta \geq 1$

From the second epoch:

1. Recording the PG
   Computing the CG

2. Computing $\theta$ between the PG and the CG
   $\theta = arccos((V_{PG} \cdot V_{CG}) / (|V_{PG}| |V_{CG}|))(180/\pi)$
   Normalizing $\theta$
   $\theta \rightarrow a \in [0, 1]$ 3. Computing the weights of gradients
   $w_{pg} \leftarrow F_{pg}(a, s_g) = s_g(1 - 2a)$
   $w_{cg} \leftarrow s_g - |w_{pg}|$ 4. Computing $\eta \leftarrow F_\eta(a, s_\eta) = -s_\eta (a - 2)$ 5. Computing the NG $\leftarrow \eta (w_{pg}PG + w_{cg}CG)$
   until the last epoch

| Symbol | Explanation | Calculation | Property |
|---|---|---|---|
| $a$ | the normalized angle of $\theta$ between the PG and the CG | PG, CG | dynamic |
| $w_{pg}$ | the weight of PG | $F_{pg}(a, s_g)$ | $a$-based |
| $w_{cg}$ | the weight of CG | $w_{pg}, s_g$ | $a$-based |
| $s_g$ | the sum of $|w_{pg}|$ and $w_{cg}$ the slope of $F_{pg}(a, s_g)$ | user defined | default=1 |
| $F_{pg}(a, s_g)$ | the function to compute $w_{pg}$ | $a, s_g$ | |
| $s_\eta$ | the slope and the minimum of $F_\eta(a, s_\eta)$ | user defined | default=1 |
| $\eta$ | the learning rate | $F_\eta(a, s_\eta)$ | $a$-based |
| $F_\eta(a, s_\eta)$ | the function to calculate $\eta$ | $a, s_\eta$ | |

FIG. 23

| Optimizer | The 5 Minimal Costs (scaled by 10,000, from the highest to the lowest) | | | | | Average | Standard Deviation | Variance |
|---|---|---|---|---|---|---|---|---|
| Vanilla | 28.59 | 28.08 | 27.73 | 27.00 | 26.79 | 27.64 | 0.7477 | 0.5591 |
| Momentum | 28.51 | 28.22 | 28.02 | 27.80 | 27.16 | 27.94 | 0.5093 | 0.2594 |
| RMSprop | 29.06 | 28.61 | 28.53 | 28.27 | 27.66 | 28.43 | 0.5142 | 0.2644 |
| Adam | 30.48 | 29.98 | 29.79 | 29.37 | 27.55 | 29.43 | 1.1261 | 1.2681 |
| Nadam | 29.53 | 29.53 | 28.83 | 28.60 | 28.27 | 28.95 | 0.5639 | 0.3180 |
| AdaMax | 28.18 | 28.01 | 27.60 | 27.08 | 26.71 | 27.52 | 0.6188 | 0.3829 |
| AdaDelta | 28.50 | 28.11 | 27.72 | 27.17 | 26.72 | 27.64 | 0.7131 | 0.5085 |
| AdaGrad | 29.14 | 28.04 | 27.94 | 27.90 | 27.69 | 28.14 | 0.5723 | 0.3275 |
| AMSGrad | 28.61 | 28.50 | 27.83 | 27.66 | 27.65 | 28.05 | 0.4681 | 0.2192 |
| AG-SGD | 25.90 | 25.80 | 25.49 | 25.03 | 25.03 | 25.45 | 0.4121 | 0.1698 |

FIG. 24

| Optimizer | The 5 Minimal Error Rates (percentages from the highest to the lowest) | | | | | Average | Standard Deviation | Variance |
|---|---|---|---|---|---|---|---|---|
| Vanilla | 1.69 | 1.61 | 1.61 | 1.59 | 1.58 | 1.62 | 0.0434 | 0.0019 |
| Momentum | 1.66 | 1.65 | 1.58 | 1.58 | 1.56 | 1.61 | 0.0456 | 0.0021 |
| RMSprop | 1.65 | 1.61 | 1.58 | 1.57 | 1.56 | 1.59 | 0.0365 | 0.0013 |
| Adam | 1.70 | 1.70 | 1.70 | 1.63 | 1.58 | 1.66 | 0.0550 | 0.0030 |
| Nadam | 1.69 | 1.69 | 1.67 | 1.63 | 1.61 | 1.66 | 0.0363 | 0.0013 |
| AdaMax | 1.62 | 1.61 | 1.61 | 1.58 | 1.58 | 1.60 | 0.0187 | 0.0004 |
| AdaDelta | 1.65 | 1.61 | 1.60 | 1.58 | 1.58 | 1.60 | 0.0288 | 0.0008 |
| AdaGrad | 1.67 | 1.66 | 1.66 | 1.64 | 1.54 | 1.63 | 0.0537 | 0.0029 |
| AMSGrad | 1.69 | 1.66 | 1.64 | 1.64 | 1.58 | 1.64 | 0.0402 | 0.0016 |
| AG-SGD | 1.46 | 1.46 | 1.45 | 1.41 | 1.41 | 1.44 | 0.0259 | 0.0007 |

FIG. 25

| $s_g = s_\eta$ | Minimal Costs (scaled by 10,000) | Minimal Error Rates (percentage) | Section Average (cost) | Section Average (error rate) |
|---|---|---|---|---|
| 1.000 | 26.32 | 1.49 | | |
| 1.025 | 25.90 | 1.46 | | |
| 1.050 | 25.31 | 1.48 | 25.80 | 1.48 |
| 1.075 | 25.66 | 1.47 | | |
| 1.100 | 25.03 | 1.41 | — | — |
| 1.125 | 25.74 | 1.48 | | |
| 1.150 | 26.28 | 1.52 | | |
| 1.175 | 26.29 | 1.52 | 26.31 | 1.51 |
| 1.200 | 26.94 | 1.53 | | |

FIG. 26

| Optimizer | [120, 130) | [130, 140) | [140, 150) | [150, 160) | [160, 170) | Total | Average |
|---|---|---|---|---|---|---|---|
| Vanilla | 6527 | 3482 | 1153 | 138 | 4 | 11304 | |
| Momentum | 5747 | 2884 | 814 | 70 | 3 | 9518 | |
| RMSprop | 6381 | 4886 | 2207 | 391 | 11 | 13876 | |
| Adam | 7498 | 4951 | 2030 | 394 | 8 | 14881 | |
| Nadam | 7165 | 4551 | 1917 | 372 | 7 | 14012 | 11830 |
| AdaMax | 6083 | 3155 | 992 | 115 | 4 | 10349 | |
| AdaDelta | 5903 | 4423 | 1775 | 244 | 12 | 12357 | |
| AdaGrad | 6282 | 5166 | 2026 | 268 | 21 | 13763 | |
| AMSGrad | 5402 | 2912 | 902 | 134 | 21 | 9371 | |
| AG-SGD | 3908 | 1289 | 205 | 18 | 2 | 5422 | 5422 |

FIG. 27

| Optimizer | Total Angle | Average Cost | Average Error Rate | Correlation Coefficient (cost) | Correlation Coefficient (error rate) |
|---|---|---|---|---|---|
| Vanilla | 11304 | 27.64 | 1.62 | | |
| Momentum | 9518 | 27.94 | 1.61 | | |
| RMSprop | 13876 | 28.43 | 1.59 | | |
| Adam | 14881 | 29.43 | 1.66 | | |
| Nadam | 14012 | 28.95 | 1.66 | 0.7923 | 0.6900 |
| AdaMax | 10349 | 27.52 | 1.60 | | |
| AdaDelta | 12357 | 27.64 | 1.60 | | |
| AdaGrad | 13763 | 28.14 | 1.63 | | |
| AMSGrad | 9371 | 28.05 | 1.64 | | |
| AG-SGD | 5422 | 25.45 | 1.44 | | |

FIG. 28

| Optimizer | The 5 Minimal Costs (scaled by 10, from the highest to the lowest) | | | | | Average | Standard Deviation | Variance |
|---|---|---|---|---|---|---|---|---|
| Vanilla | 21.74 | 19.09 | 13.65 | 12.65 | 10.62 | 15.5518 | 4.6675 | 21.7855 |
| Momentum | 21.76 | 21.64 | 21.29 | 20.28 | 13.11 | 19.6155 | 3.6856 | 13.5835 |
| RMSprop | 16.24 | 15.66 | 15.64 | 15.29 | 14.96 | 15.5574 | 0.4748 | 0.2255 |
| Adam | 14.13 | 13.92 | 12.05 | 11.82 | 10.51 | 12.4868 | 1.5250 | 2.3255 |
| Nadam | 12.99 | 12.62 | 12.58 | 12.58 | 12.55 | 12.6655 | 0.1849 | 0.0342 |
| AdaMax | 20.89 | 12.62 | 12.36 | 11.73 | 10.96 | 13.7132 | 4.0637 | 16.5134 |
| AdaDelta | 8.84 | 8.77 | 8.70 | 8.43 | 8.13 | 8.5736 | 0.2930 | 0.0858 |
| AdaGrad | 12.90 | 12.40 | 11.70 | 11.55 | 11.13 | 11.9348 | 0.7066 | 0.4992 |
| AMSGrad | 13.22 | 13.19 | 12.62 | 12.55 | 12.02 | 12.7200 | 0.5034 | 0.2534 |
| AG-SGD | 8.78 | 8.64 | 8.60 | 8.40 | 8.11 | 8.5050 | 0.2601 | 0.0677 |

FIG. 29

| Optimizer | The 5 Minimal Error Rates (percentages from the highest to the lowest) | | | | | Average | Standard Deviation | Variance |
|---|---|---|---|---|---|---|---|---|
| Vanilla | 21.66 | 20.83 | 20.12 | 19.93 | 17.48 | 20.00 | 1.5664 | 2.4535 |
| Momentum | 21.25 | 20.71 | 20.67 | 18.66 | 18.29 | 19.92 | 1.3416 | 1.8000 |
| RMSprop | 17.58 | 17.57 | 17.47 | 17.41 | 17.39 | 17.48 | 0.0882 | 0.0078 |
| Adam | 19.72 | 19.48 | 19.23 | 18.13 | 18.07 | 18.93 | 0.7740 | 0.5990 |
| Nadam | 18.56 | 18.54 | 18.32 | 18.30 | 18.29 | 18.40 | 0.1357 | 0.0184 |
| AdaMax | 24.54 | 24.44 | 24.41 | 23.34 | 23.07 | 23.96 | 0.6975 | 0.4865 |
| AdaDelta | 15.37 | 15.37 | 15.00 | 14.43 | 12.94 | 14.62 | 1.0159 | 1.0320 |
| AdaGrad | 24.55 | 24.49 | 24.43 | 24.40 | 23.85 | 24.34 | 0.2821 | 0.0796 |
| AMSGrad | 17.90 | 17.85 | 17.80 | 17.61 | 17.48 | 17.73 | 0.1768 | 0.0313 |
| AG-SGD | 14.46 | 14.05 | 13.67 | 13.51 | 12.87 | 13.71 | 0.5969 | 0.3563 |

FIG. 30

AG-SGD

Setting values for $s_g$ and $s_\eta$, where $s_g \geq 1$ and $s_\eta \geq 1$
From the second epoch:
1. Recording the PG
   Computing the CG
2. Computing $\theta$ between the PG and the CG
   $\theta = arccos((V_{PG} \cdot V_{CG}) / (|V_{PG}| |V_{CG}|))(180/\pi)$
   Normalizing $\theta$
   $\theta \rightarrow a \in [0, 1]$
3. Computing the weights of gradients
   $w_{pg} \leftarrow F_{pg}(a, s_g) = s_g(1 - 2a)$
   $w_{cg} \leftarrow s_g - |w_{pg}|$
4. Computing $\eta \leftarrow F_\eta(a, s_\eta) = -s_\eta (a - 2)$
5. Computing the NG $\leftarrow \eta (w_{pg}PG + w_{cg}CG)$
   until the last epoch

FIG. 31

SYSTEMS AND METHODS USING ANGLE-BASED STOCHASTIC GRADIENT DESCENT

BACKGROUND

In the field of machine learning (ML), there are an increasing number of problems (e.g., face recognition, high-level semantic embeddings of multimedia, and natural language recognition) that are resolved by various neural networks. Stochastic gradient descent (SGD) has been used in neural networks to minimize the cost, and it achieves its goal through computing the gradient of a mini-batch and updating the weights and biases accordingly. There are two types of deviations associated with this process: (1) the gradient from each mini-batch is different from the full dataset; and (2) the gradient from the past mini-batch is different from the current mini-batch selected for the gradient. In order to eliminate the first deviation, the existing SGD optimization algorithms or optimizers attempt to generate an accurate new gradient (NG) by combining the current gradient (CG) and the past gradient (PG). This process can be classified into three categories: (1) improving the gradient; (2) improving the learning rate; and (3) improving both gradient and learning rate.

For example, the Momentum method employs the exponential moving average of the PG and the CG (see Polyak, Some methods of speeding up the convergence of iteration methods, USSR Computational Mathematics and Mathematical Physics, vol. 4, pp. 1-17, 1964; which is hereby incorporated by reference herein in its entirety). AdaGrad divides the learning rate by the square root of the cumulative PG and CG (see Duchi et al., Adaptive subgradient methods for online learning and stochastic optimization, Journal of Machine Learning Research, vol. 12, pp. 2121-2159, 2011; which is hereby incorporated by reference herein in its entirety). RMSprop improves the learning rate of the AdaGrad using the exponential moving average of the gradients, which is the standard approach of updating the learning rate adopted in most optimizers (see Botev et al., Nesterov's Accelerated Gradient and Momentum as approximations to regularized update descent, 2017 International Joint Conference on Neural Networks (IJCNN), Anchorage, Ak., USA, 2017; which is hereby incorporated by reference herein in its entirety). AdaDelta revises RMSprop by replacing the learning rate with the exponential moving average of the squared difference of the gradients (see Zeiler, ADADELTA: An adaptive learning rate method," 2012, [Online], Available: https://arxiv.org/abs/1212.5701; which is hereby incorporated by reference herein in its entirety). Adam combines the methods of Momentum and RMSprop, and AdaMax is a special version of Adam that employs infinity norm (see Kingma et al., Adam: a method for stochastic optimization," 3rd International Conference on Learning Representations, San Diego, May 2015; and Dogo et al, A comparative analysis of gradient descent-based optimization algorithms on convolutional neural networks, 2018 International Conference on Computational Techniques, Electronics and Mechanical Systems (CTEMS), Belgaum, India, 2018; which are both hereby incorporated by reference herein in their entireties).

All of these optimizers attempt to improve the accuracy of the NG by employing the original past gradient (OPG), which is computed from the outdated SGD state, so these optimizers are susceptible to the second deviation. This deviation accumulates as the SGD is determined with the rendering of a local minimum cost.

BRIEF SUMMARY

Embodiments of the subject invention alleviate the second type of deviation discussed in the Background. Embodiments of the subject invention provide novel and advantageous systems and methods for optimizing and/or solving objective functions (e.g., in a model such as a machine learning (ML) model (e.g., neural network, logistic regression)). An improved algorithm, based on angle-based stochastic gradient descent (AG-SGD), can be used to alleviate pattern deviation(s) not resolved by related art systems and methods. AG-SGD can use the angle between the current gradient (CG) and the previous gradient (PG) to determine the new gradient (NG). The systems and methods utilizing the AG-SGD can accelerate result convergence (reducing training time) and/or allow for a more complex model (i.e., deep learning). AG-SGD is independent from any specific ML model or data pattern, and it can realize consistent improvements on accuracy and efficiency in practice.

In an embodiment, a system for optimizing an objective function using a stochastic gradient descent (SGD) approach can comprise a processor and a machine-readable medium in operable communication with the processor and having instructions stored thereon that, when executed by the processor, perform the following steps: performing a SGD process on the objective function, in which a NG is determined at each epoch of the SGD process; determining, at each epoch, an inner angle ($\theta$) between a PG and a CG; adjusting, at each epoch, a weight ($w_{pg}$) of the PG and a weight ($w_{cg}$) of the CG ($w_{cg}$) based on the inner angle ($\theta$) to give a weighted PG and a weighted CG; computing, at each epoch, a learning rate ($\eta$) based on the weighted PG and the weighted CG; and computing, at each epoch, the NG for the respective epoch by combining the weighted PG and the weighted CG and multiplying the result by the learning rate. The determining of the inner angle ($\theta$) can comprise calculating the inner angle ($\theta$) using Equation (1):

$$\theta = \arccos((V_{PG} \cdot V_{CG})/(|V_{PG}||V_{CG}|))(180/\pi) \quad (1)$$

where $V_{PG}$ is a vector of the PG and $V_{CG}$ is a vector of the CG, and $V_{PG} \cdot V_{CG}$ is a vector dot product of $V_{PG}$ and $V_{CG}$. The instructions when executed by the processor can further perform the following steps: if the inner angle ($\theta$) is less than 90° at an epoch, setting the PG to be equal to an original past gradient before computing the NG for that respective epoch; if the inner angle ($\theta$) is greater than 90° at an epoch, reversing a direction of the PG before computing the NG for that respective epoch; and if the inner angle ($\theta$) is equal to 90° at an epoch, adjusting the weighted PG to zero before computing the NG for that respective epoch. The adjusting of the weight of the PG and the weight of the CG can comprise: if the inner angle ($\theta$) moves closer to 0° or 180° than it was in a most recent previous epoch, increasing a ratio of the weight of the PG to the weight of the CG ($w_{pg}/w_{cg}$); and if the inner angle ($\theta$) moves closer to 90° than it was in a most recent previous epoch, decreasing the ratio of the weight of the PG to the weight of the CG ($w_{pg}/w_{cg}$). The objective function can be part of a machine learning (ML) model (e.g., a deep learning model, a neural network, and/or a logistic regression). The adjusting of the weight of the PG and the weight of the CG can comprise setting and utilizing a first parameter ($s_g$) that contributes to controlling a magnitude of NG, and the computing of the learning rate ($\eta$) comprising setting and utilizing a second parameter ($s_\eta$) that is a lower bound of the learning rate ($\eta$). The first parameter ($s_g$) can have a value that is greater than 0.820 and less than 1.156, and/or the second parameter ($s_\eta$) can have a value that is greater than 0.820 and less than 1.156.

In another embodiment, a method for optimizing objective functions using a SGD approach can comprise: performing (e.g., by a processor) a SGD process on the objective function, in which a NG is determined at each epoch of the SGD process; determining (e.g., by the processor), at each epoch, an inner angle ($\theta$) between a PG and a CG; adjusting (e.g., by the processor), at each epoch, a weight ($w_{pg}$) of the PG and a weight ($w_{cg}$) of the CG based on the inner angle ($\theta$) to give a weighted PG and a weighted CG; computing (e.g., by the processor), at each epoch, a learning rate ($\eta$) based on the weighted PG and the weighted CG; and computing (e.g., by the processor), at each epoch, the NG for the respective epoch by combining the weighted PG and the weighted CG and multiplying the result by the learning rate. The determining of the inner angle ($\theta$) can comprise calculating the inner angle ($\theta$) using Equation (1). The method can further comprise: if the inner angle ($\theta$) is less than 90° at an epoch, setting the PG to be equal to an original past gradient before computing the NG for that respective epoch; if the inner angle ($\theta$) is greater than 90° at an epoch, reversing a direction of the PG before computing the NG for that respective epoch; and if the inner angle ($\theta$) is equal to 90° at an epoch, adjusting the weighted PG to zero before computing the NG for that respective epoch. The adjusting of the weight of the PG and the weight of the CG can comprise: if the inner angle ($\theta$) moves closer to 0° or 180° than it was in a most recent previous epoch, increasing a ratio of the weight of the PG to the weight of the CG ($w_{pg}/w_{cg}$); and if the inner angle ($\theta$) moves closer to 90° than it was in a most recent previous epoch, decreasing the ratio of the weight of the PG to the weight of the CG ($w_{pg}/w_{cg}$). The objective function can be part of a machine learning (ML) model (e.g., a deep learning model, a neural network, and/or a logistic regression). The adjusting of the weight of the PG and the weight of the CG can comprise setting and utilizing a first parameter ($s_g$) that contributes to controlling a magnitude of NG, and the computing of the learning rate ($\eta$) comprising setting and utilizing a second parameter ($s_\eta$) that is a lower bound of the learning rate ($\eta$). The first parameter ($s_g$) can have a value that is greater than 0.820 and less than 1.156, and/or the second parameter ($s_\eta$) can have a value that is greater than 0.820 and less than 1.156.

BRIEF DESCRIPTION OF DRAWINGS

FIG. 23 shows a table of angle-based parameters and functions.

FIG. 24 shows a table of comparison of the five minimal costs (scaled by 10,000) on the MNIST dataset.

FIG. 25 shows a table of the comparison of the five minimal error rates (in %) on the MNIST dataset.

FIG. 26 shows a table of the best results with varied parameters.

FIG. 27 shows a table of the number of angles in different sections.

FIG. 28 shows a table of the correlation coefficients between obtuse angles and cost/error rate.

FIG. 29 shows a table of the comparison of the five minimal costs (scaled by 10) for the NSL-KDD dataset.

FIG. 30 shows a table of the comparison of the five minimal error rates (in %) for the NSL-KDD dataset.

FIG. 31 shows pseudocode for AG-SGD, according to an embodiment of the subject invention.

DETAILED DESCRIPTION

Figure 1:
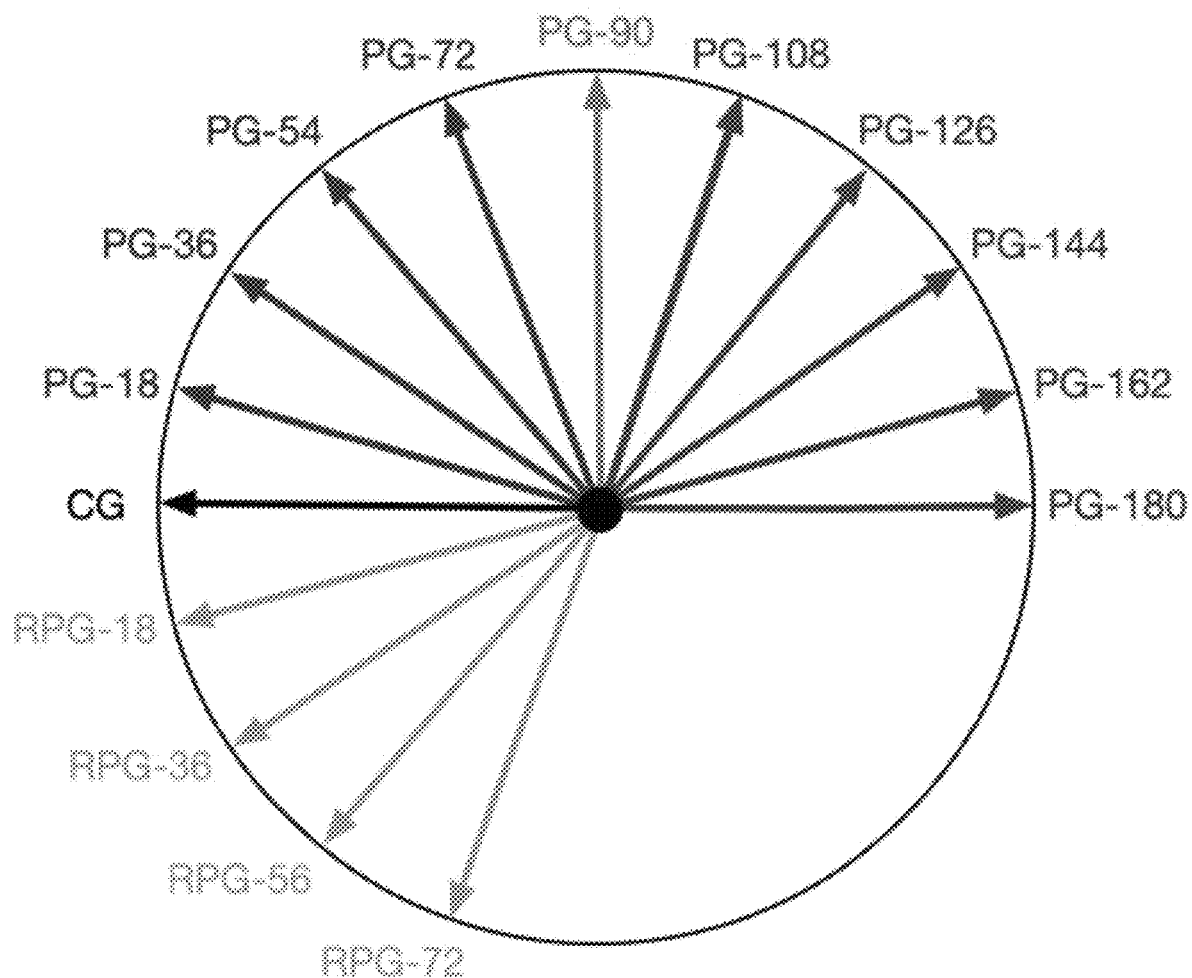
FIG. 1 shows a quantifying a deviation of past gradient (PG) using the inner angle between PG and current gradient (CG). The numbers at the tips of the arrows are angles; the deviation of PG varies with the angle.

Embodiments of the subject invention provide novel and advantageous systems and methods for optimizing and/or solving objective functions (e.g., in a model such as a machine learning (ML) model (e.g., neural network, logistic regression)). An improved algorithm, based on angle-based stochastic gradient descent (AG-SGD), can be used to alleviate pattern deviation(s) not resolved by related art systems and methods. AG-SGD can use the angle between the current gradient (CG) and the previous gradient (PG) to determine the new gradient (NG). The systems and methods utilizing the AG-SGD can accelerate result convergence (reducing training time) and/or allow for a more complex model (i.e., deep learning). AG-SGD is independent from any specific ML model or data pattern, and it can realize consistent improvements on accuracy and efficiency in practice.

Systems and methods of embodiments of the subject invention can identify a new pattern deviation between the current and the previous mini-batches, employing the angle between the current gradient and the previous gradient as the metric to quantify the newly identified pattern deviation. This leads to higher accuracy compared to related art systems and methods. Embodiments can also identify and address a critical shortcoming of the exponential weighted (EW) approach that is widely used in related art optimization algorithms for generating a new gradient; EW can be replaced in embodiments by simple vector addition. Weights of the previous and the current gradients can be adjusted based on the angle when generating the new gradient.

Systems and methods of embodiments of the subject invention can have faster convergence compared to related art systems and methods. If the cost is accidentally increased to a high value due to pattern deviation between the mini-batch and the full dataset, it can be reduced in the next epoch (instead of multiple epochs as in the related art). Also, the trajectory of the cost reduction can be optimized due to more accurate new gradients, so the trajectory length and the number of steps to approach the minimum cost can be reduced. In addition, because the metric in use (the angle between two vectors) is a mathematical concept with determined properties, the algorithm is more robust than related art methods that are designed based on a specific problem characteristic.

Related art systems and methods have a critical shortcoming by utilizing an EW approach for generating the NG. The PG contains useful information and must be referred when computing the NG, and the principles of a neural network involve a lot of mathematical knowledge. The angle between two vectors (i.e., gradients) can be used in systems and methods of embodiments of the subject invention as the metric to quantify and remove the deviation on the PG (i.e., calibration). Also, the CG is more reliable than the PG in most circumstances. As a result, AG-SGD relies more on the CG when computing the NG, and the calibrated PG is used to calibrate the CG.

When a numerical range is presented herein as [x, y), where x and y are numbers, the range is meant to be from x to y, including x but excluding y. When a numerical range is presented herein as (x, y], where x and y are numbers, the range is meant to be from x to y, excluding x but including y. When a numerical range is presented herein as (x, y), where x and y are numbers, the range is meant to be from x to y, excluding both x and y. When a numerical range is presented herein as [x, y], where x and y are numbers, the range is meant to be from x to y, including both x and y.

The AG-SGD algorithm of embodiments of the subject invention can improve the machine on which it is running by minimizing computing resource costs. This technical solution solves the technical problem of vast amounts of computing resources being required to solve and/or optimize difficult objective functions on computing machines.

In order to calibrate the inaccurate PG, its deviation needs to be quantified. In order to achieve this goal, an accurate gradient must be located as a reference for quantification. In principle, the CG is calculated based on the most-updated SGD state, so it is more reliable than the PG in computing the NG. The CG is a qualified gradient reference and can be used to quantify the deviation of PG by the angle between them. As a result, the AG-SGD technique of embodiments of the subject invention generates the NG following these four steps: (1) determine the inner angle, $\theta$, between the PG and the CG; (2) adjust the weights of the PG and the CG according to 0; (3) combine the weighted PG and CG; and (4) multiply the learning rate, $\eta$, accordingly based on the gradient combination. This is possible because the gradient matches the parameters of a neural network with regard to its data structure (i.e., multi-dimensional matrix), and the elements of a gradient can be flattened into a vector V (e.g., the function "ravel" provided by the library Numpy can be used (see Numpy.ravel, [Online], Available: https://numpy.org/doc/stable/reference/generated/numpy.ravel.html; which is hereby incorporate by reference herein in its entirety). As a result, the inner angle between the PG and the CG can be computed by Equation (1).

$$\theta = \arccos((V_{PG} \cdot V_{CG})/(|V_{PG}||V_{CG}|))(180/\pi) \qquad (1)$$

where $V_{PG}$ is the vector of the PG and $V_{CG}$ is the vector of the CG, and $V_{PG} \cdot V_{CG}$ is the vector dot product of $V_{PG}$ and $V_{CG}$.

FIG. 1 shows the deviation between the two gradients, where the numbers at the tip of the arrows indicate the $\theta$ value, determined as the angle deviation between the associated PG and CG. For example, PG-54 means that the angle of PG relative to that of CG is 54°. The figure denotes that a smaller $\theta$ renders a closer alignment, indicating a smaller deviation of the PG. Further, $\theta$ can be divided into three subsets [0°, 90°), (90°, 180°] and [90°], in order to follow the corresponding actions:

(a) When $\theta$<90°, the PG is roughly aligned with the CG. In this case, the PG=original past gradient (OPG) can be used to compute the NG without calibration.

(b) When $\theta$>90°, the PG has a significant deviation from the CG. Under this circumstance, the PG has to be calibrated prior to the NG computation. One way is to reverse the direction of PG, so that the reversed past gradient (RPG) will be roughly aligned with the CG as in case (a). For instance, RPG-18 is a reversal in direction of PG-162, which can be used to compute the NG directly.

(c) When $\theta$=90°, the PG is perpendicular to the CG. This indicates that the two gradients have no correlation (two vectors have no correlation when they are orthogonal).

Therefore, the PG should be abandoned when computing the NG under this case.

In order to further utilize the above properties, there are two key points related to the accuracy of the PG in determining the NG that need to be indicated. First, as $\theta$ approaches 0° or 180°, the OPG or RPG aligns more with the CG and becomes more valuable in the NG computation. Second, as $\theta$ approaches 90°, the PG will have less contribution to the estimation of the NG as it correlates less with the CG.

Because an accurate NG must result from reliable gradients, the improvement is realized by adjusting the weights of past and current gradients according to 0; that is:

(i) When $\theta$ approaches 0° or 180°, the ratio $w_{pg}/w_{cg}$ can be increased by a larger value, as the OPG or the RPG becomes more accurate.

(ii) When $\theta$ approaches 90°, the value of the ratio $w_{pg}/w_{cg}$ is decreased, i.e., the CG dominates the NG computation.

Also, with a larger $\theta$, the SGD trajectory becomes more chaotic. This occurs as the two gradients will counteract each other rendering an NG with higher uncertainty. In order to prevent or inhibit the cost from being misled to a higher value, the learning rate should be decreased when $\theta$ approaches 180°.

Figure 5:
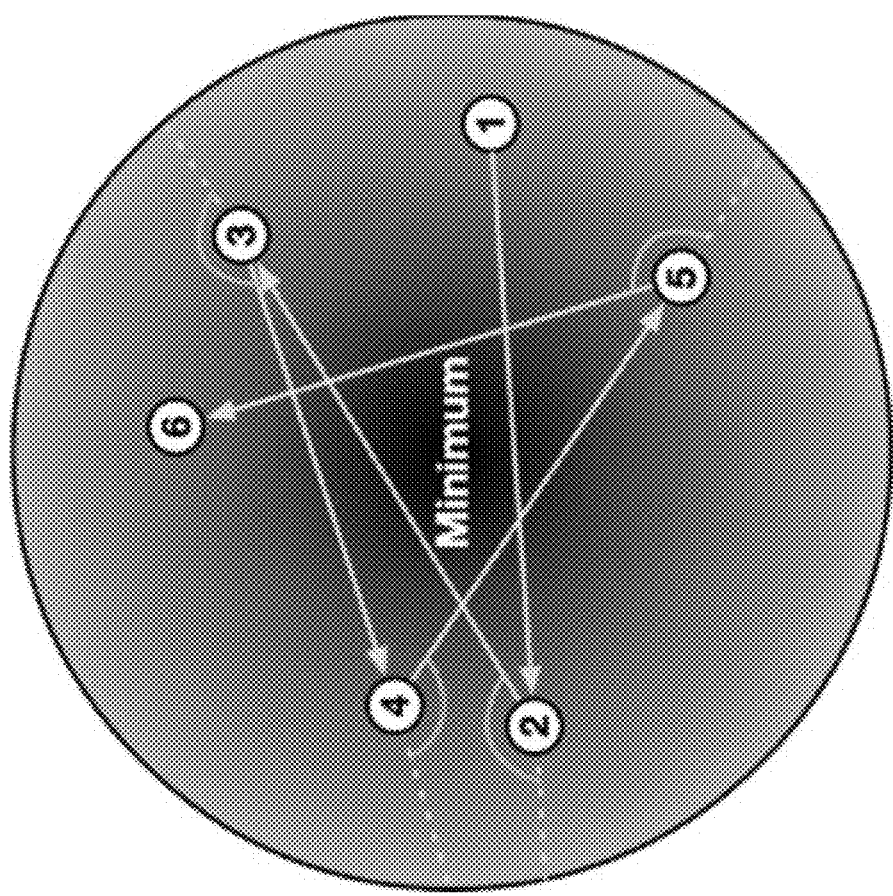
FIG. 5 shows cost variance trajectories in a final stochastic gradient descent (SGD) stage. A darker shade indicates a lower cost, and more obtuse angles would be generated during the cost wandering around the minimum.

In the early and middle stages of SGD, the cost is repeatedly reduced until it approaches one of the minima (phase 1). Once the cost is oscillating within a small range and cannot be reduced further, it means that the result has converged (phase 2). One of the distinct differences between these two phases is the averaged angle between consecutive gradients of the phase 2 is larger than the phase 1. As shown in FIG. 5, the main reason that this occurs is that more obtuse angles are generated with the cost repeatedly overshoot/wander around the minimum during the final converging stage. In this case, if the step length is reduced every time an obtuse angle is generated, the step length would gradually approach 0, resulting in a lower converged cost.

Figure 4:
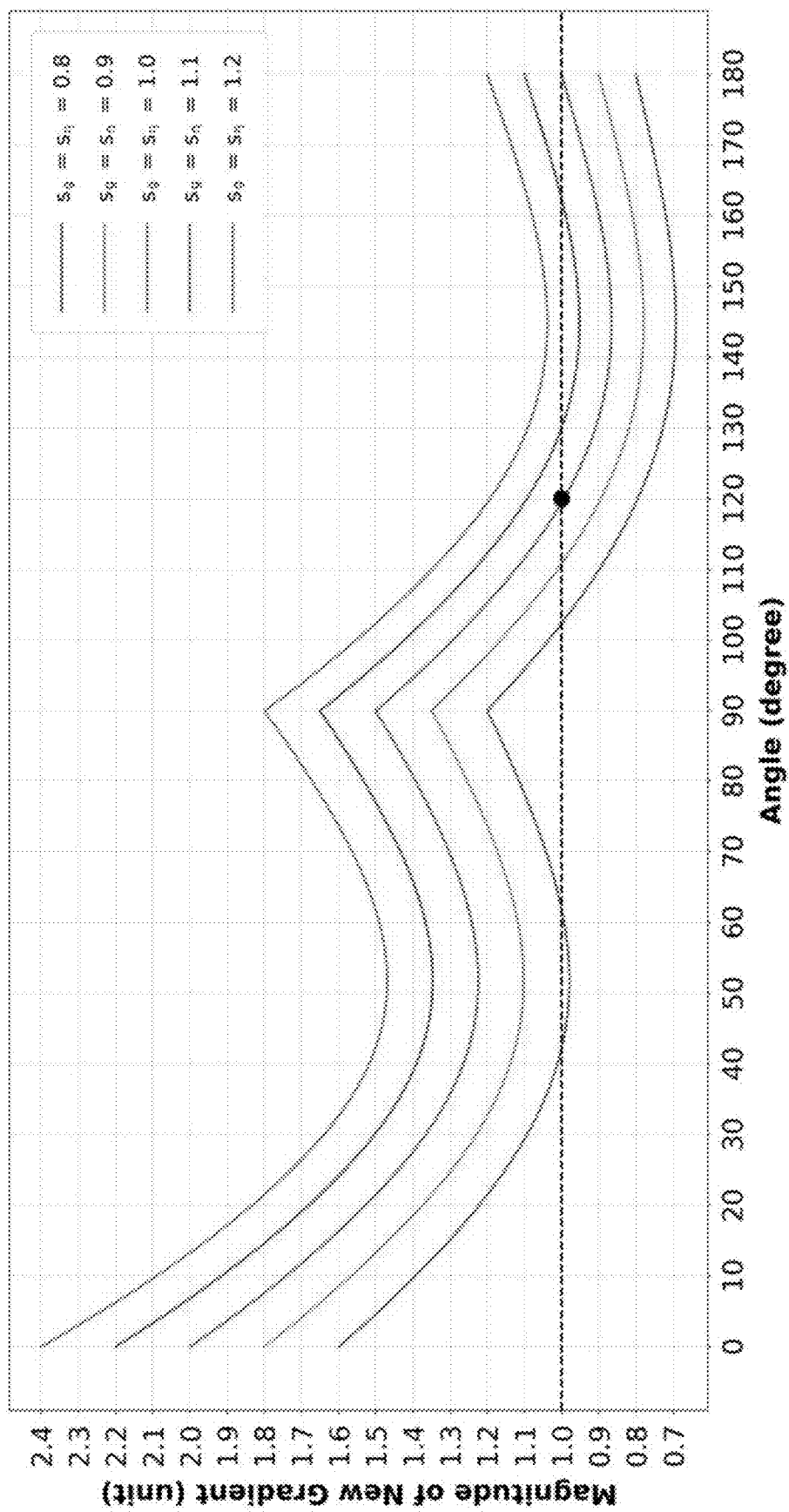
FIG. 4 shows a plot of magnitude of new gradient (NG) versus angle (in degrees), showing the magnitude variance of the NG with the changes of $s_g$ and $s_\eta$. The black dot indicates the NG magnitude that is reduced when the angle is larger than 120° under the default setting. The (purple) curve with the highest magnitude values is for $s_g=s_\eta=1.2$; the (red) curve with the second-highest magnitude values is for $s_g=s_\eta=1.1$; the (green) curve with the third-highest magnitude values is for $s_g=s_\eta=1.0$; the (orange) curve with the fourth-highest magnitude values is for $s_g=s_\eta=0.9$; and the (blue) curve with the lowest magnitude values is for $s_g=s_\eta=0.8$.

This convergence principle is utilized and employed by AG-SGD, as shown in FIG. 4. Under its default configuration (i.e., $s_g = s_{r_1} = 1.0$), the NG magnitude is smaller than 1.0 unit when $\theta$ is in (120°, 180°), so the step length is reduced when $\theta$ is in this section. A section (e.g., (120°, 180°)) that causes a reduction in the NG magnitude and fosters a cost convergence is called a Convergence Section (CS). If this default CS is still narrow and renders a non-convergence failure, the CS could be enlarged by decreasing $s_g$ or $s_{r_1}$ to achieve a stronger convergence. In order to demonstrate the functionalities realized by each parameter, FIG. 6 and FIG.

Figure 6:
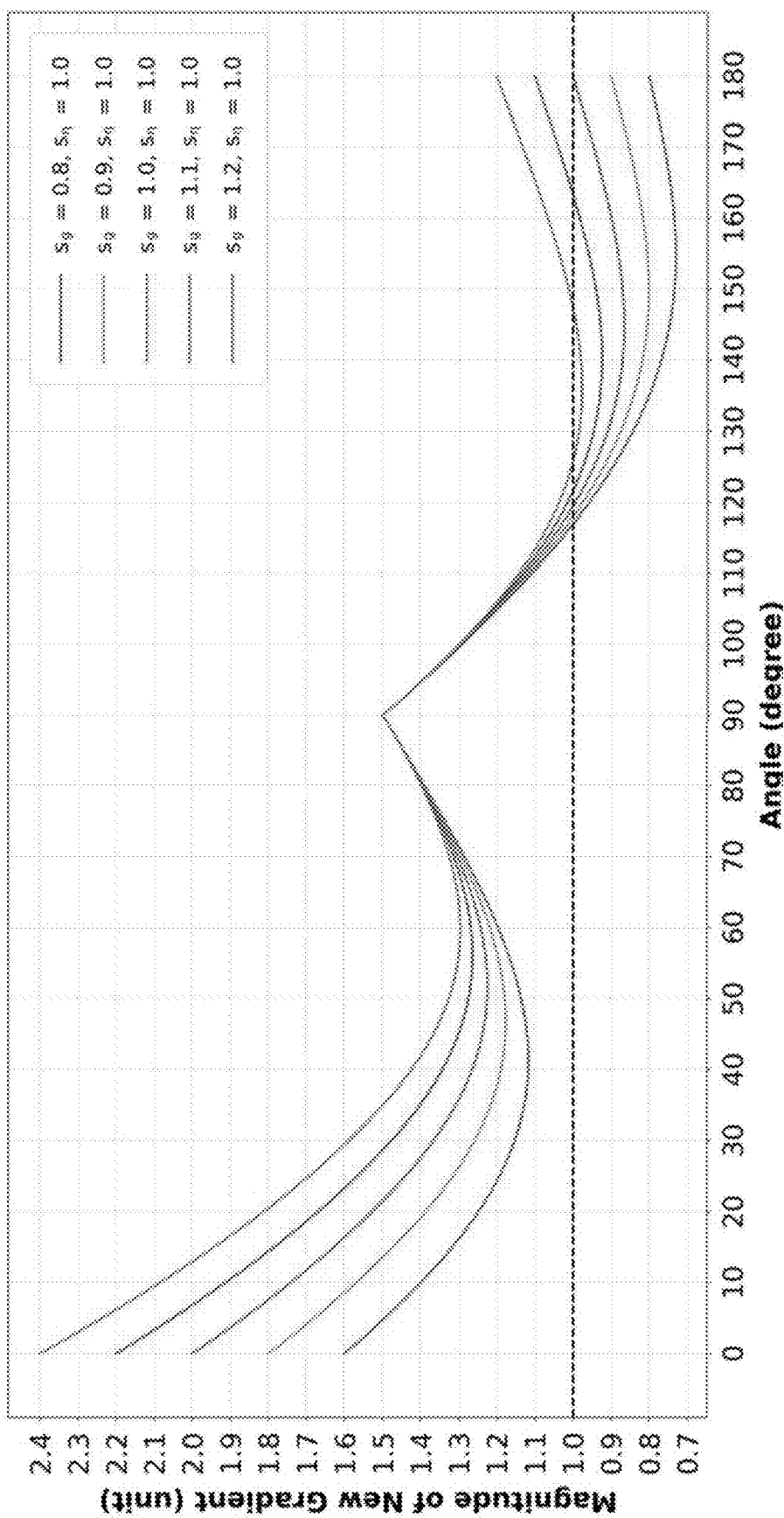
FIG. 6 shows a plot of magnitude of NG versus angle (in degrees), showing changes in $s_g$ affecting the NG magnitude when the angle is close to 90°. The (purple) curve with the highest magnitude value at 0° is for $s_g=1.2$, $s_\eta=1.0$; the (red) curve with the second-highest magnitude value at 0° is for $s_g=1.1$, $s_\eta=1.0$; the (green) curve with the third-highest magnitude value at 0° is for $s_g=s_\eta=1.0$; the (orange) curve with the fourth-highest magnitude value at 0° is for $s_g=0.9$, $s_\eta=1.0$; and the (blue) curve with the lowest magnitude value at 0° is for $s_g=0.8$, $s_\eta=1.0$.

7 show the variance pattern between the angle and the corresponding NG magnitude when $s_\eta/s_g$ is 1.0 and when $s_g/s_\eta$ varies in the range [0.8, 1.2]. These two parameters are mutually complementary in their functionalities, where their differences are:

(1) $s_g$ is mainly used to change the magnitude of NG when θ approaches 0° or 180°, as shown in FIG. 6. Adjusting $s_g$ will primarily modify the upper bound of the CS and associate the NG strength reduction.

Figure 7:
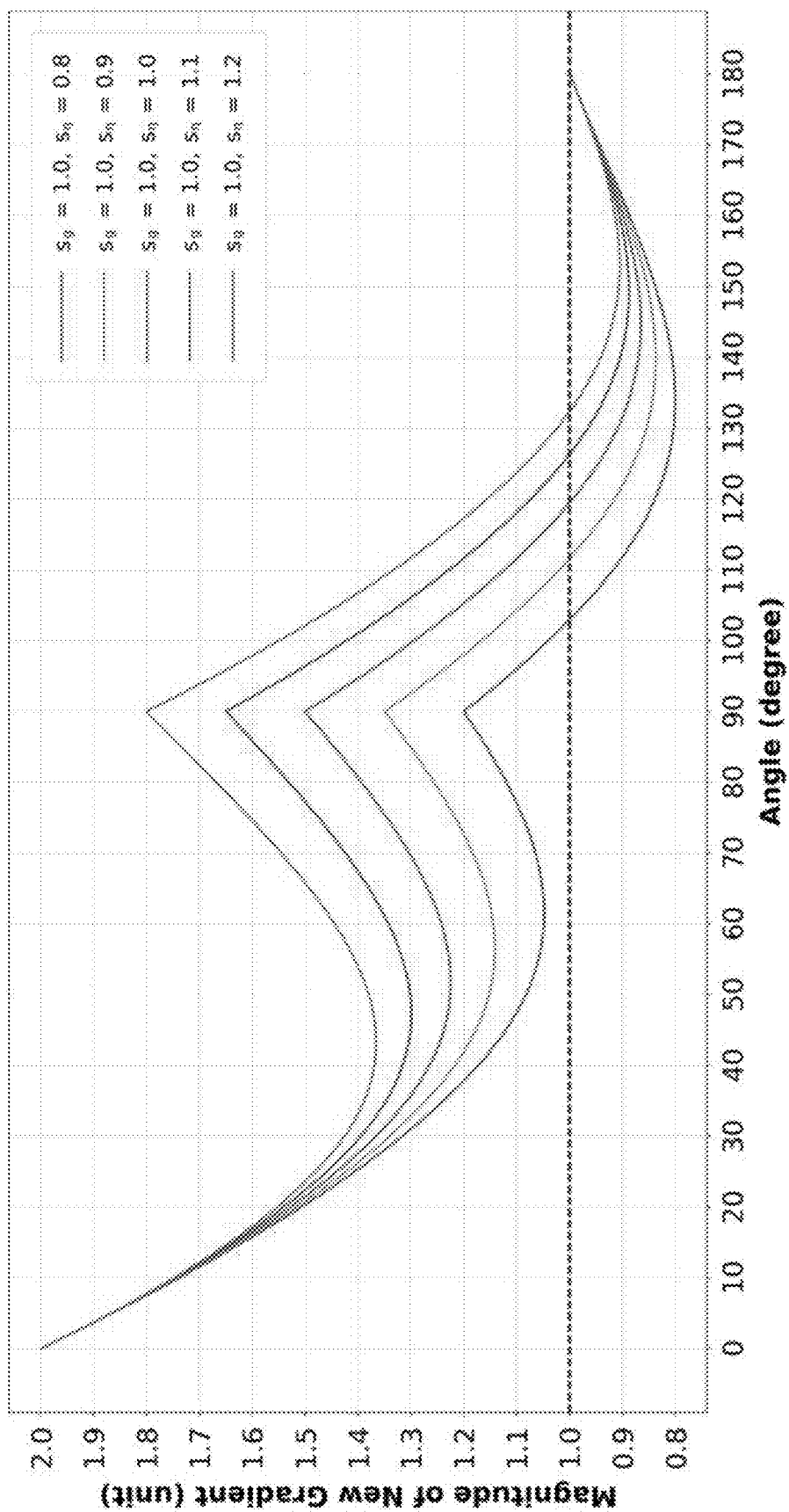
FIG. 7 shows a plot of magnitude of NG versus angle (in degrees), showing changes in $s_\eta$ affecting the NG magnitude when the angle is close to 0° and 180°. The (purple) curve with the highest magnitude value at 90° is for $s_g=1.0$, $s_\eta=1.2$; the (red) curve with the second-highest magnitude value at 90° is for $s_g=1.0$, $s_\eta=1.1$; the (green) curve with the third-highest magnitude value at 90° is for $s_g=s_\eta=1.0$; the (orange) curve with the fourth-highest magnitude value at 90° is for $s_g=1.0$, $s_\eta=0.9$; and the (blue) curve with the lowest magnitude value at 90° is for $s_g=1.0$, $s_\eta=0.8$.

(2) $s_\eta$ is primarily used to adjust the NG magnitude when θ is close to 90°, as shown in FIG. 7. Changing $s_\eta$ will mainly adjust the lower bound of the CS and the related NG strength reduction.

Further, it is evident that adjusting the two parameters together will obtain all the aforementioned changes at once. However, if the $s_g$ and $s_\eta$ are changed by the same magnitude, they should be adjusted within the recommended configuration section (0.820, 1.156) due to:

(1) When $s_g=s_\eta\leq 0.820$, the average of NG for the entire section of θ is less than 0.9996, which is averaged from the 181 NGs of all the integral angles in [0°, 180°]. In this case, the SGD will not be accelerated, which violates the goal of employing optimizers.

(2) When $s_g=s_\eta\geq 1.156$, the CS is an empty set, meaning that a non-convergence failure is inevitable, as the NG will not be reduced in the entire section of θ.

Figure 3:
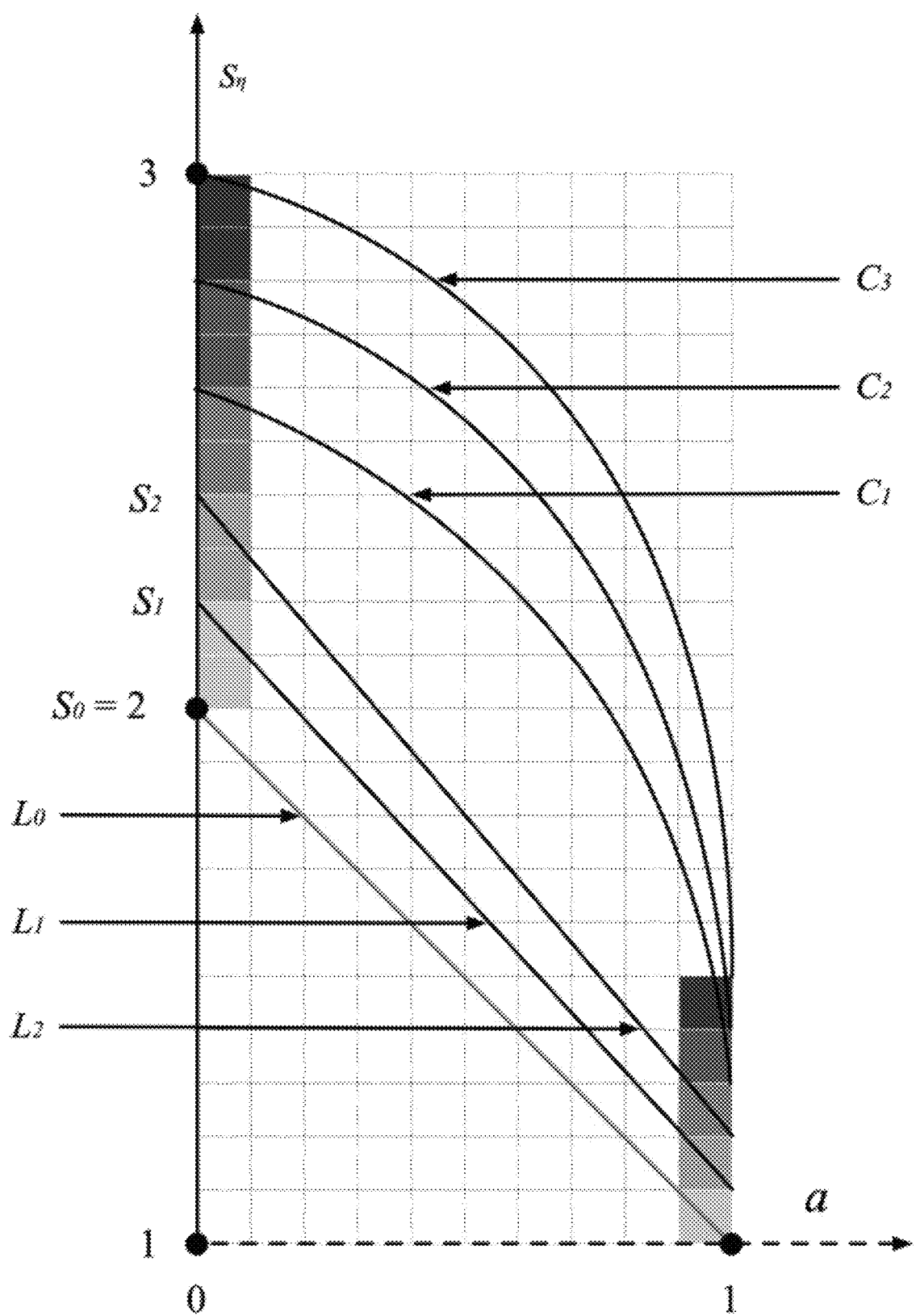
FIG. 3 shows the definition of the function $F_\eta(a, s_g)$. Lines and curves other than $L_0$ are alternative supportive definitions.

This recommended configuration section applies to datasets in any problem field, as they are solely determined by the characteristic of AG-SGD. Because the average of this section is 0.988 (i.e., (0.820+1.156)/2), the default values of $s_g$ and $s_\eta$ are set to 1.0 for achieving an accelerated SGD that mitigates the non-convergence failure. In addition, the averaged NG magnitude is 1.219 under the default configuration, so it is a conservative setting that mitigates overshooting, but adversely impacts the SGD speed. Therefore, increasing the default values appropriately may speed-up SGD without missing the optimal result in practice. Moreover, $F_\eta(a,s_\eta)$ is also designed with the consideration of mitigating the non-convergence failure. Referring to FIG. 3, η will increase by a smaller magnitude with a approaching 1. For example, if η (a=0) is increased by 2 units (i.e., from $s_1$ to $s_2$), η (a=1) is increased by 1 unit. The variance pattern of the NG magnitude is not changed when both $s_g$ and $s_\eta$ change with the same magnitude, as shown in FIG. 4. This property is advantageous and utilized during the early and middle tuning stages to foster faster configuration searching. For example, if the lowest achieved cost is not satisfactory, the step lengths can be decreased in the entire section of θ by reducing both $s_g$ and $s_\eta$. In order to make a fine adjustment, the values of $s_g$ and $s_\eta$ should be separately changed. For instance, if the cost is still randomly oscillating in a large range after many epochs, it indicates the cost is approaching a minimum with a large step length. Because more obtuse angles are generated during this process, it should first be attempted to decrease $s_g$ to reduce the step lengths when θ is close to 180°. Due to the fact that decreasing $s_g$ will also reduce the step lengths when θ is close to 0°, a slower overall convergence speed is the side-effect of this manipulation. Consequently, there is a trade-off between the convergence speed and overshooting.

FIG. 31 shows the pseudocode for AG-SGD, which can be used with systems and methods of the subject invention. Referring to the pseudocode presented in FIG. 31, if the simple addition and multiplication are assumed to be O(1), the time complexity of the proposed optimization algorithm is bounded/determined according to the vector dot-product (i.e., $V_{PG} \cdot V_{CG}$) in Equation (1). Because the dot-product performs an element-wised multiplication between the two gradients, then the AG-SGD computational complexity is O(n), where n represents the length of the two vectors.

Figure 8:
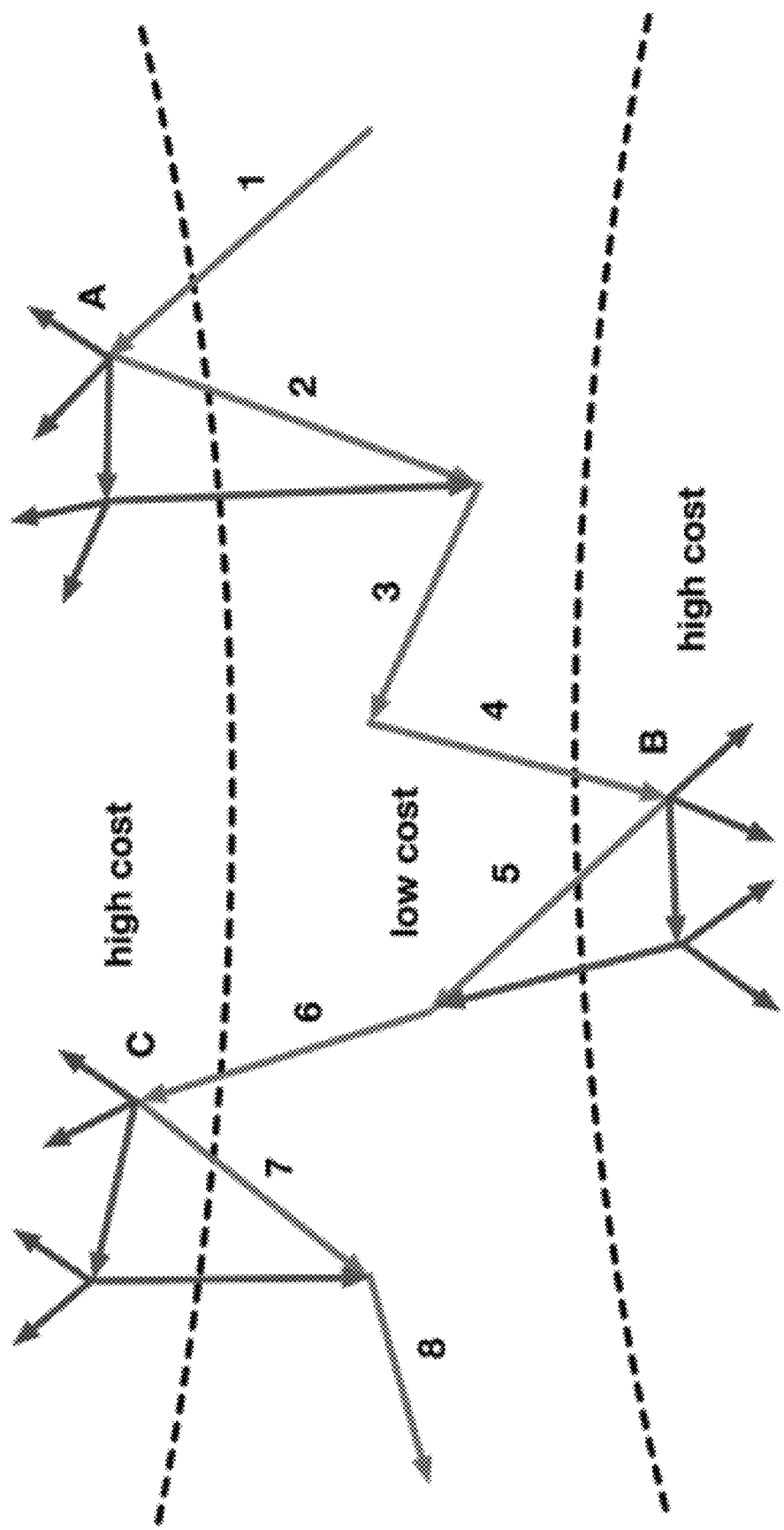
FIG. 8 shows the SGD trajectory of angle-based SGD (AG-SGD), according to an embodiment of the subject invention. PG will be reversed when the cost is increased; the (green) Gs 2, 5, 7 result from AG-SGD; the (blue) Gs result from other optimizers; and the (red) Gs will result in higher costs if PG is not reversed.

Due to the gradient deviation between the mini-batch and the full dataset, the cost might be misguided to a higher value as SGD proceeds in time. Referring to FIG. 8, if the PG is not reversed, the cost reduction would follow the unlabeled (blue) longer gradients. Each step on the high cost areas is susceptible to being misguided to a higher value by the unlabeled (red) shorter gradients (the twelve arrows near the "high cost" labels), because they are influenced with the aforementioned pattern deviation. The key in resolving this problem is to reduce the cost as soon as possible, as indicated in FIG. 8 with the A, B, and C positions. If the PG is reversed prior to combining with the CG, the cost reduction would follow the (green) gradients labeled 2, 5, and 7. Consequently, AG-SGD would converge faster and generate less obtuse angles than related art optimizers, due to the one-step cost reduction.

In addition to machine learning experts, systems and methods of embodiments of the subject invention are applicable to non-professional users (e.g., programmers working for small businesses) wanting to obtain insight from their data with minimum effort. In order to better serve these users, AG-SGD is specifically designed/enhanced on the following four aspects:

(1) Due to the fact that non-professional users have limited ability of tuning parameters, AG-SGD sets the mean of recommended section (i.e., (0.820, 1.156)) as the default configuration to better fitting data in most fields. Also, it abandons all the measurements without finite parameter spaces (e.g., adjusting the learning rate manually) because a universal value that results in decent performances on various datasets cannot be determined (e.g., it is common to see the magnitude of learning rate change between levels of $10^{-1}/10^{-2}/10^{-3}/10^{-4}$). It is evident that non-professional users are unable to tune these types of parameters.

(2) In order to improve the accuracy using the default setting, AG-SGD intends to guide non-professional users in training more complex models (i.e., more layers and/or more neurons in layers) instead of tuning various parameters. A more reasonable approach is that the former is not only more understandable (i.e., the larger the better), but also more effective than the latter because the complexity/architecture is the foundation of ML model.

(3) Because non-professional users usually do not have high performance computing systems, it is assumed that powerful GPUs are not available to accelerate AG-SGD. Therefore, in order to reduce the time cost in training a complex model, it is important to establish a very small batch size and improve the corresponding accuracy. Because AG-SGD is proven to be effective on the smallest batch size (i.e., 1), its usage has a much lower requirement than other optimizers which have to set much larger batch sizes (e.g., 128/256/512 . . . ) for achieving decent results. As such, AG-SGD can train very complex models within the same time period as other methods.

(4) High accuracies can be obtained by setting the two parameters of AG-SGD to the same value v (i.e., $s_g=s_\eta=v$, where v∈(0.820, 1.156)). Because v determines the CS, a v that's close to 0.820/1.156 will result in a weaker/stronger convergence, which indicates a more conservative/aggressive configuration (i.e., the correlation between the intensity of convergence and the magnitude of ν is monotonous). This intuitive interpretation of the parameter tuning is completely understandable to non-professional users and provides sufficient guidelines for finding the best result. For example, if a user obtains a higher accuracy by decreasing ν from 1.1 to 1.0, the former could be interpreted as a somewhat more aggressive configuration then a ν that's smaller than 1.1 should be tried. Although other optimizers also have one parameter, these parameters have no monotonous correlation with the intensity of convergence. Consider the parameter β of Momentum, the effects of which can be difficult for non-professional users to fully understand. Particularly, the consequences of adjusting β in terms of convergence intensity are completely unpredictable. The usage difficulties of other optimizers (e.g., Adam) with multiple parameters (e.g., β, $β_1$, $β_2$, η, ε, etc.) are not comparable to the simplicity of using AG-SGD in a significant manner.

It is evident that none of the compared optimizers (from the examples) meet all four requirements. For example, AdaGrad has one parameter (i.e., learning rate), but its value changes too radically (i.e., cannot define a universal value as the default setting) and is obscure to non-professional users. Most importantly, its error rates are far beyond AG-SGD (e.g., the averaged error rates: 24.34% versus 13.71% in FIG. 30). Consequently, AG-SGD has a significant advantage on the intended application (i.e., used by non-professional users), which can be implemented into platforms that provide Auto-ML solutions (i.e., training ML models from built-in free-tuned algorithms), such as Amazon SageMaker Autopilot.

In certain embodiments, adjusting the two parameters ($s_g$, $s_η$) together is the recommended configuration approach for non-professional users, but machine learning experts can achieve higher accuracies by tuning each parameter separately. Though, one intended objective of AG-SGD is to fine tune the search for better definitions of $F_{pg}(a,s_g)$ and $F_η(a,s_η)$, by developing a new tuning section with a better CS for non-professional users in an effort to improve their results.

Embodiments of the subject invention can utilize AG-SGD to optimize the SGD result. The principle behind the improvement is to minimize the deviation of the past gradient. Because the angle between consecutive gradients reflects the deviation, the goal is realized by adjusting the weight of the past gradient based on the angle. In certain scenarios, the past gradient will be reversed as needed. This manipulation could reduce the cost in only one step after it is misled to a higher value, due to the gradient deviation between the mini-batch and the full dataset. As a result, the old gradients would become more reliable and generate a more accurate new gradient.

Embodiments of the subject invention contribute to the field of SGD optimization algorithm via at least the following three aspects: (1) identifying, quantifying, and reducing the deviation on the past gradient; (2) optimizing the cost based on a new metric (i.e., the angle between consecutive gradients); and (3) providing one-step cost reduction via reversing the past gradient prior to its usage. In addition, the two parameters, $s_g$ and $s_η$ establish a clear boundary in their functionality when generating the new gradient, so an improved configuration is easily derived following the guidelines. The experiments presented in the examples utilize the original linear definitions of the functions $F_{pg}(a,s_g)$ and $F_η(a,s_η)$, so it is possible that improved results are achievable using different alternatives that yield superior results.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

In order to comprehend the concepts of AG-SGD, the AG-SGD technique was implemented using six parameters and two functions as shown in FIG. 23. The parameters $w_{pg}$ and $w_{cg}$ are weights of the PG and the CG, respectively; $s_g$ is the slope of $F_{pg}(a,s_g)$, which controls the magnitude of the NG by limiting these two weights. Equation (2) is used to compute $w_{pg}$; and $s_η$ is the lower bound of the learning rate η determined by Equation (3). The third column in FIG. 23 (calculation) lists all the necessary parameters required to compute the corresponding parameters and functions. For instance, $w_{pg}$ and $s_g$ are needed to compute $w_{cg}$.

$$F_{pg}(a,s_g)=s_g(1-2a) \qquad (2)$$

$$F_η(a,s_η)=-s_η(a-2) \qquad (3)$$

Figure 2:
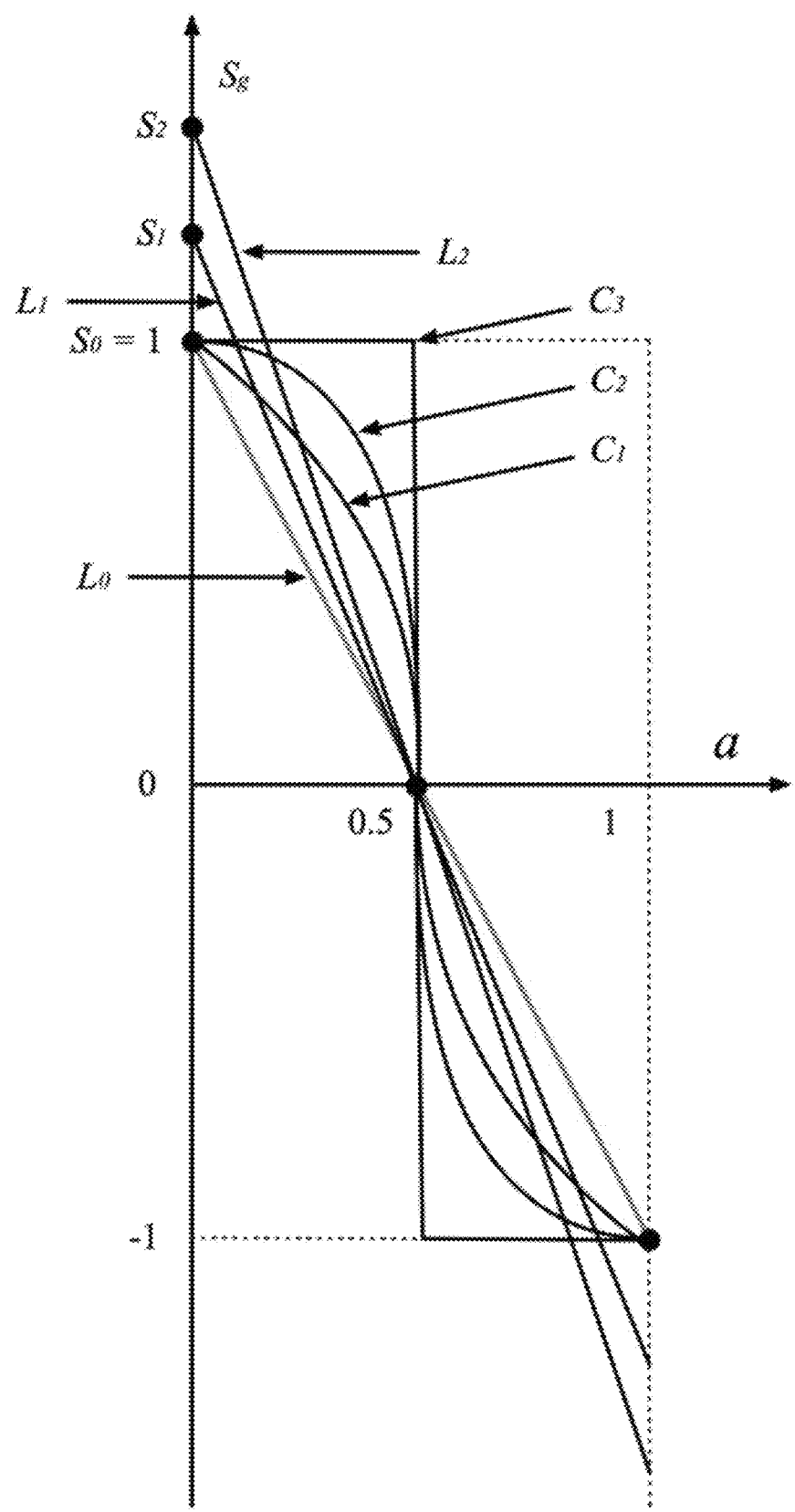
FIG. 2 shows the definition of the function $F_{pg}(a, s_g)$. Lines and curves other than $L_0$ are alternative supportive definitions.

In order to commence the AG-SGD, the two user-defined parameters $s_g$ and $s_η$ were initialized each with a value 1.0. These initial values of $s_g$ and $s_η$ correspond to the two straight lines $L_0$ (red) in FIG. 2 and FIG. 3, respectively. In each epoch, θ between the PG and the CG is normalized as a∈[0,1] by dividing its value by 180°. Next, the values of a and $s_g$ are input to $F_{pg}(a,s_g)$ (Equation (2)) to compute $w_{pg}$; then $w_{cg}$ is determined using $s_g-|w_{pg}|$. The learning rate η is computed according to $F_η(a,s_η)$. Finally, the NG is formed as $η(w_{pg}PG+w_{cg}CG)$. Here the functions $F_{pg}(a,s_g)$ and $F_η(a,s_η)$ are defined as $s_g(1-2a)$ and $-s_η(a-2)$, respectively. There are four different cases that arise given the various possible measurements of these components:

(1) When a<0.5 (i.e., θ<90°), $w_{pg}>0$ and OPG=PG. Because $w_{pg}$ increases as a (or θ) approaches 0 (or 0°) and $w_{cg}$ inversely varies with $w_{pg}$ (because $w_{cg}=s_g-|w_{pg}|$ and $s_g$ is a fixed value), the OPG will have a greater contribution to the NG generation as a (or θ) gets close to 0 (or 0°).

(2) When a>0.5 (i.e., θ>90°), $w_{pg}<0$, which means that the minus sign reverses the direction of the PG. Therefore, the RPG aligns more with the CG and gradually dominates the NG computation as a (or θ) approaches 1 (or 180°).

(3) When a=0.5 (i.e., θ=90°), the contribution of the PG in calculating the NG will be zero, i.e., the NG is solely determined by the CG because $w_{pg}=0$.

(4) The learning rate η is monotonically decreasing in the entire range of a (or θ), mitigating the possibilities of rendering a chaotic SGD trajectory and misleading a higher cost value associated with a larger a (or θ).

In addition, there are two important concepts that need to be emphasized to understand AG-SGD:

(1) Although the computation of the NG is separately dominated by the OPG and the RPG as θ approaches 0° and 180°, the OPG and the RPG can be approximated with CG, as they are closely aligned with each other. In this sense, AG-SGD behaves similar to Vanilla SGD when θ approaches 0°, 180°, and 90° because the NG is gradually dominated by the CG under these circumstances.

(2) A line/curve is an effective alternative to $L_0$ of $F_{pg}(a,s_g)$ and $F_η(a,s_η)$, as long as it satisfies the following four requirements. They are: (i) a is limited within [0, 1]; (ii) the line/curve has to be continuously and monotonically decreasing within [0, 1]; (iii) the interception point on the horizontal axis is 0.5; and (iv) the intercept point on the vertical axis is not less than 1 for $F_{pg}(a,s_g)$ and 2 for $F_η(a,s_η)$. Accordingly, the lines $L_1$, $L_2$, and curves $C_1$, $C_2$, $C_3$ are promising alternatives for $L_0$, which may achieve better results on problems in certain fields.

As a result, the NG magnitude is determined by combining $F_{pg}(a,s_g)$ and $F_η(a,s_η)$. FIG. 4 shows the variance pattern between the angle and the corresponding NG magnitude when the CG and the PG are 1.0 unit in magnitude. For example, the NG magnitude is larger/smaller than the CG and the PG when the angle is in [0°, 120°)/(120°, 180°) and will not change when the angle is 120° or 180° under the default setting ($s_g=s_η=1.0$). Further, the NG roughly decreases as the angle increases, which stabilizes the SGD trajectory. Because $w_{pg}$ is close to 0 as θ approaches 90°, the most reliable CG gradually dominates the NG computation, producing a peak at θ=90°. When θ is close to 0° or 180°, the CG becomes better aligned with the OPG or the RPG, which renders a larger $w_{pg}$ forming a larger NG. The two troughs are achieved when the OPG/RPG have larger difference with the CG in determining an accurate NG, so these two gradients are involved in the NG computation with greater comparable weights. Consequently, the smaller NGs are attributed to the weight assignment between $w_{pg}$ and $w_{cg}$.

Example 2

In order to avoid any bias, the effectiveness of AG-SGD was demonstrated in two experiments that differentiate in: (1) machine learning algorithm; (2) cost function; (3) batch size; and (4) datasets associated with different fields. In the first experiment AG-SGD was implemented with a fully-connected Vanilla neural network and evaluated on the handwritten digits Modified National Institute of Standards and Technology (MNIST) dataset (see LeCun et al, The MNIST database of handwritten digits. [Online], Available: http://yann.lecun.com/exdb/mnist/; which is hereby incorporated by reference herein in its entirety). The second experiment employed a logistic regression classifier to evaluate AG-SGD on the contest-level network-based intrusion detection dataset NSL-KDD (see Tavallaee et al., A detailed analysis of the KDD CUP 99 data set, 2nd IEEE Symposium on Computational Intelligence for Security and Defense Applications (CISDA), Ottawa, ON, Canada, 2009; which is hereby incorporated by reference herein in its entirety). In terms of comparison, ten SGD optimizers were evaluated under the same set of conditions in both experiments: (1) Vanilla SGD; (2) Momentum; (3) RMSprop; (4) Adam; (5) Nadam; (6) AdaMax; (7) AdaDelta; (8) AdaGrad; (9) AMSGrad; and (10) AG-SGD.

The fully-connected Vanilla neural network has four layers. Each layer employs Sigmoid as the activation function (see Keras, Layer activation functions, [Online], Available: https://keras.io/api/layers/activations/; which is hereby incorporated by reference herein in its entirety). The numbers of neurons from the input to the output layers are 784, 256, 112, and 10, respectively. The output cost is quantified using the Mean Squared Root (MSE) (see Keras, Regression losses, https://keras.io/api/losses/regression_losses/#meansquarederror-class; which is hereby incorporated by reference herein in its entirety). For the usage of the MNIST dataset, the pre-split 60,000 samples were employed for training and 10,000 samples were employed for testing. In order to evaluate the AG-SGD under the intended application scenario, the batch size and number of epochs were set to 8 and 50 (note: it was found that larger values for these quantities do not reduce any further the testing costs of all compared optimizers). As a result, there were 375,000 gradients (i.e., 60,000/8×50) generated during SGD to minimize the output cost.

A good optimization result could occur accidentally, when the data are well-matched among the different techniques and could generate skewed positive cost reduction from the proposed method. In order to avoid this possibility, the classifiers evaluated did not employ any additional technique such as dropout, weight decay, or learning rate decay. Therefore, the difference in the cost reduction should be attributed solely to the adopted optimizer. In addition, instead of evaluating the best result, the best five results were selected to represent the performance of each optimizer. As a reference, the error rate of a fully-connected Vanilla neural network on the original MNIST dataset is about 2% based on the Kaggle leaderboard scores (see Kaggle, Learn computer vision fundamentals with the famous MNIST data, [Online], Available: https://www.kaggle.com/c/digit-recognizer/discussion/61480; which is hereby incorporated by reference herein in its entirety).

Figure 9:
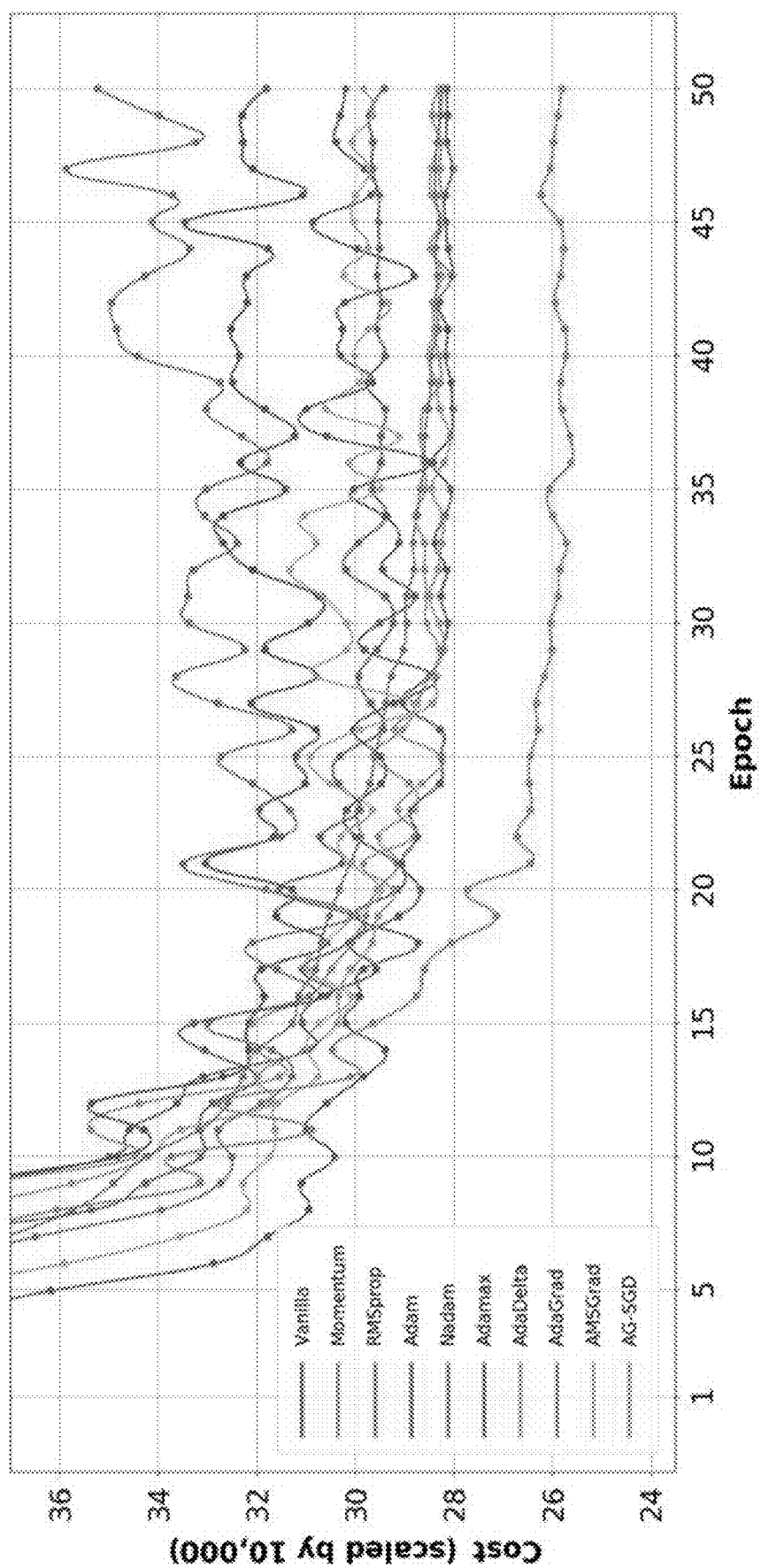
FIG. 9 shows a plot of cost (scaled by 10,000) versus epoch, showing the epoch-wised average of the five minimal costs (with each dot representing the cost of specific optimizer on the corresponding epoch). The (turquoise) curve with the lowest cost at epoch 30 is for AG-SGD; the (blue) curve with the second-lowest cost at epoch 30 is for Vanilla; the (pink) curve with the third-lowest cost at epoch 30 is for AdaDelta; the (orange) curve with the fourth-lowest cost at epoch 30 is for Momentum; the (gray) curve with the fifth-lowest cost at epoch 30 is for AdaGrad; the (green) curve with the sixth-lowest cost at epoch 30 is for RMSprop; the (brown) curve with the seventh-lowest cost at epoch 30 is for AdaMax; the (tan) curve with the third-highest cost at epoch 30 is for AMSGrad; the (red) curve with the second-highest cost at epoch 30 is for Adam; and the (purple) curve with the highest cost at epoch 30 is for Nadam.
Figure 10:
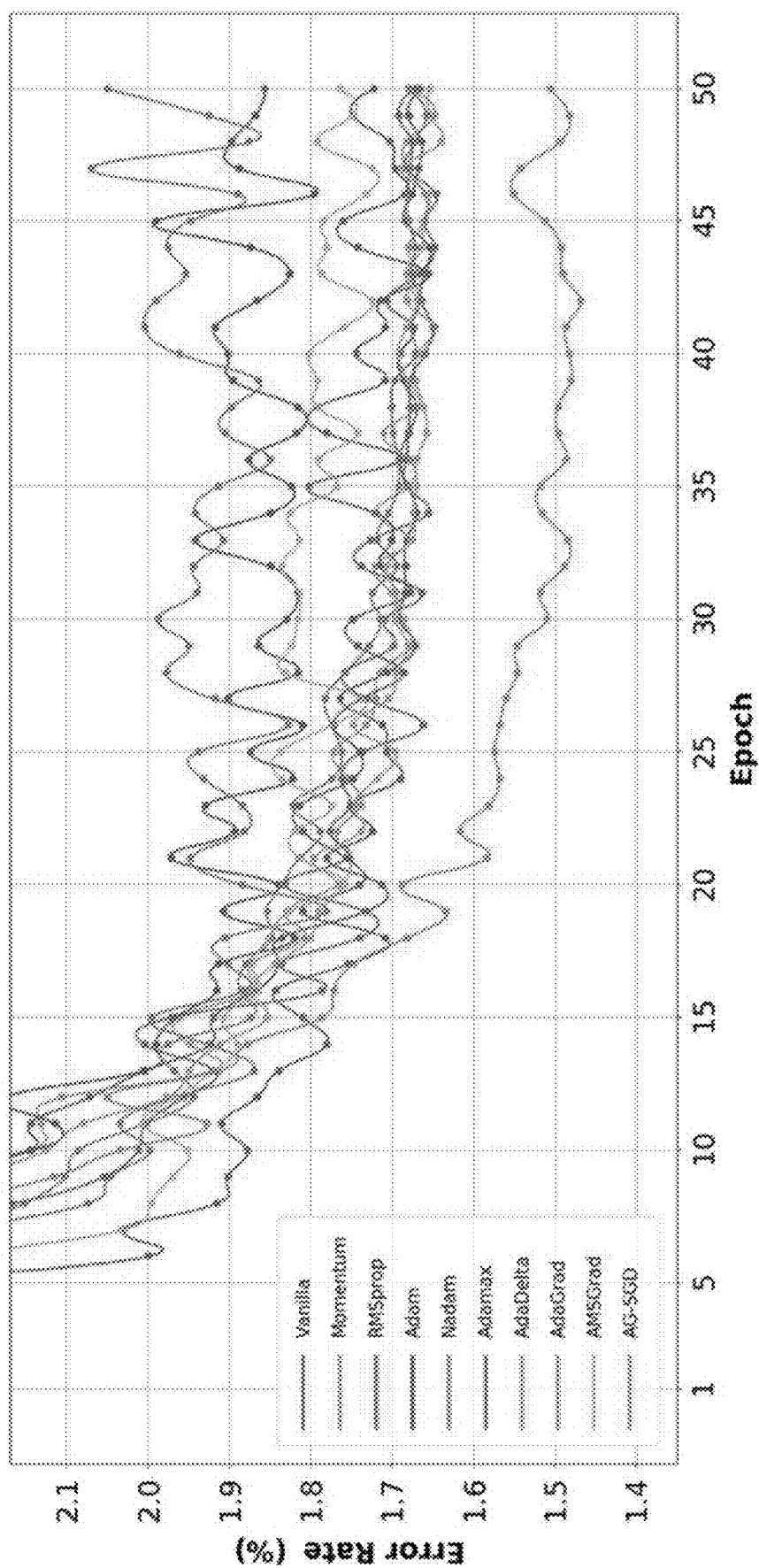
FIG. 10 shows a plot of error rate (in percentage (%)) versus epoch, showing the epoch-wised average of the five minimal error rates (with each dot representing the error rate of specific optimizer on the corresponding epoch). The (turquoise) curve with the lowest cost at epoch 30 is for AG-SGD; the (orange) curve with the second-lowest cost at epoch 30 is for Momentum; the (blue) curve with the third-lowest cost at epoch 30 is for Vanilla; the (pink) curve with the fourth-lowest cost at epoch 30 is for AdaDelta; the (green) curve with the fifth-lowest cost at epoch 30 is for RMSprop; the (gray) curve with the sixth-lowest cost at epoch 30 is for AdaGrad; the (brown) curve with the seventh-lowest cost at epoch 30 is for AdaMax; the (tan) curve with the third-highest cost at epoch 30 is for AMSGrad; the (red) curve with the second-highest cost at epoch 30 is for Adam; and the (purple) curve with the highest cost at epoch 30 is for Nadam.

FIG. 9 and FIG. 10 show the epoch-wised average of the five minimal costs and the associated error rates from the ten SGD optimizers, respectively. Each value in these figures is computed by averaging the corresponding five values on the same epoch. The ten optimizers were rated into four levels based on their results. In level 1, Adam and Nadam were outperformed by all the other optimizers with relative significant magnitudes in cost and error reductions. Also, they were unstable as shown by the oscillated curves. Particularly, Nadam was considered the worst performing optimizer due to the increasing cost beyond epoch 40, which translated to a non-convergence failure. In level 2, AdaMax, AMS-Grad, and RMSprop performed better in the cost/error rate reduction and stability than the optimizers in the previous level. In addition, AdaMax converged faster than the rest of the optimizers in the first 14 epochs. In level 3, the Vanilla, Momentum, AdaDelta, and AdaGrad were more stable than the aforementioned optimizers because their curves were fluctuating within smaller ranges. These optimizers achieved the lowest costs and error rates compared with all the analyzed the optimizers. In level 4, AG-SGD outperformed all the other optimizers in terms of the cost and error rate reductions. Although its converging speed was slower than that of AdaMax in the first 14 epochs, AG-SGD greatly increased its speed between epochs 14 to 19 and obtained a cost as low as the best cost achieved by the others on epoch 18. This advantage in cost was maintained until the last epoch, which occupies 66% of the training time (i.e., (50−18+1)/50). It can be expected that the error rate could be further reduced along with the elongation of the training time. If the cost of AG-SGD had been oscillating as with the other optimizers, it would only end up with a local optimal error rate.

Figure 11:
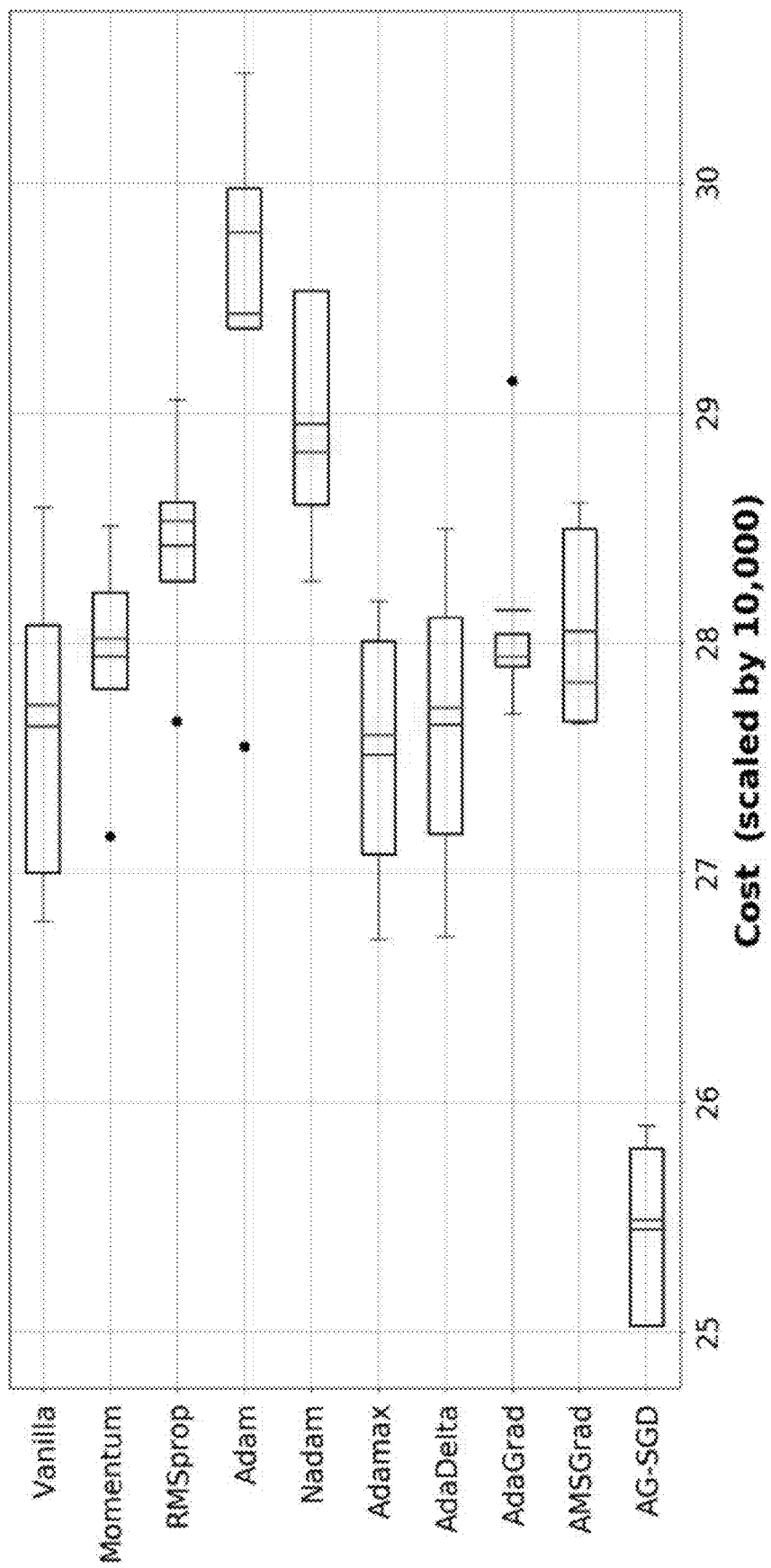
FIG. 11 shows a plot of distributions of the five minimal costs on the Modified National Institute of Standards and Technology (MNIST) dataset; black dots are outliers.
Figure 12:
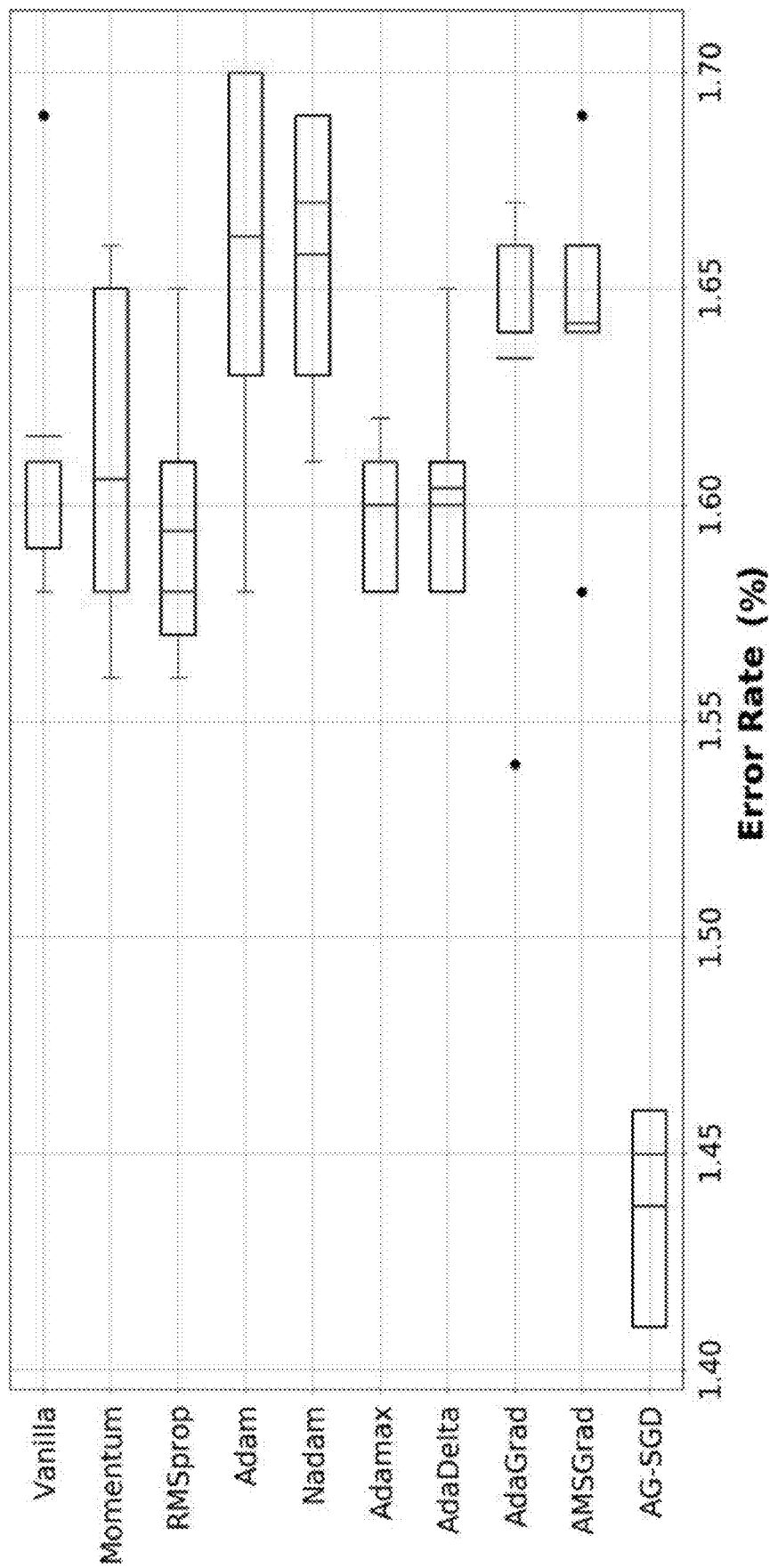
FIG. 12 shows a plot of distributions of the five minimal error rates on the MNIST dataset; black dots are outliers.

The above observations can be verified by the distributions of the best five results in FIGS. 11 and 12, where the data dots are the outliers of the corresponding five results. The optimizers were rated into three levels based on the existence of outliers and the range of values (i.e., the length of boxes). At level 1, there are six optimizers—Vanilla, Momentum, RMSprop, Adam, AdaGrad, and AMSGrad—and all have at least one outlier in both FIG. 11 and FIG. 12. Although the ranges of the non-outlaid values are more concentrated, it means that these optimizers would generate local minimal results in most cases. Employing them in practice would miss the optimal result by a relative higher probability. At level 2, Nadam and AdaDelta are included due to their scattered results. Although their results do not have an outlier, the larger value ranges would make their results relative harder to predict compared with the optimizers in level 1. Because the optimizers in the first two levels have distinct characteristics in their result distributions, it is difficult to judge which level would perform better in practice. At level 3, AG-SGD and AdaMax both have no outliers, but are more concentrated than the other two levels. The distinct difference between the two optimizers is that AG-SGD could generate a lower cost and error rate than AdaMax.

FIGS. 24 and 25 show the comparison of the five minimal costs and the corresponding error rates, respectively, from the ten SGD optimizers. The data show that AG-SGD is the most accurate optimizer with the best stability. If the advantages were quantified by averaging the minimal costs (i.e., 27.36) and the variances (i.e., 0.4564) from all the other optimizers, AG-SGD has a better performance by 8.52%= (27.36−25.03)/27.36 in the cost reduction and 62.80%= (0.4564−0.1698)/0.4564 in stability.

In order to compare the lowest costs resulting from parameters within and beyond the recommended CS, AG-SGD was tested on MNIST with ten different combinations of $s_g$ and $s_n$, starting from 1.000 and with 0.025 step-size. FIG. 26 shows that the best achieved results were when both parameters had the same value of 1.100. Also, the cost and the error rate were (roughly) decreasing in [1.000, 1.100] and increasing in [1.100, 1.200]. These tendencies indicate that AG-SGD outperforms on the current dataset when these two parameters are chosen close to 1.100. Further, because the results achieved in the section averaged within [1.000, 1.100] are better than the results in [1.100, 1.200], the optimal parameters are found in [1.000, 1.100] with a higher probability.

Figure 13:
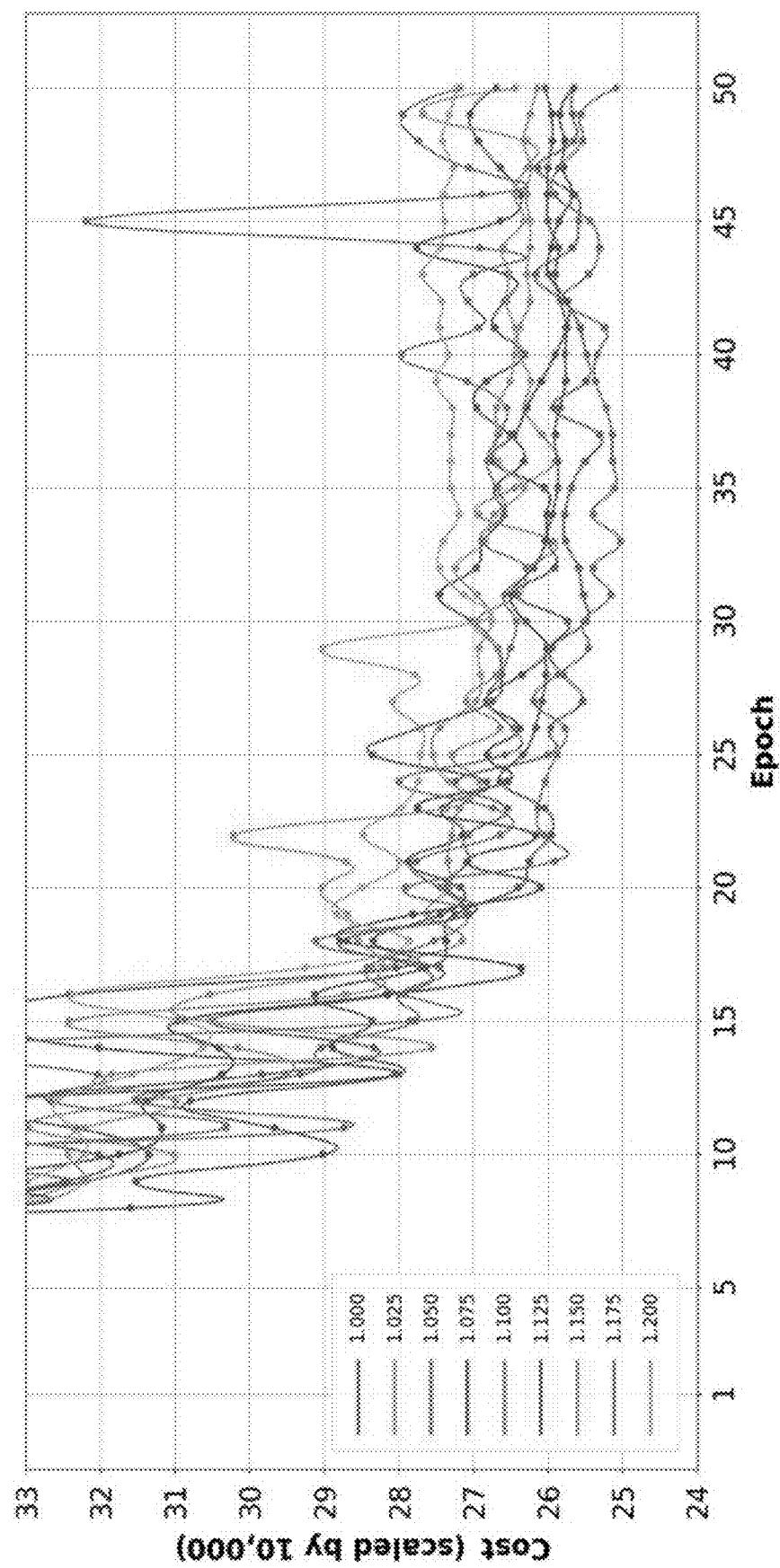
FIG. 13 shows a plot of cost (scaled by 10,000) versus epoch, showing the minimal costs with varied parameters (with each dot representing the cost of the specific configuration on the corresponding epoch). The (purple) curve with the lowest cost at epoch 45 is for $s_g=s_\eta=1.100$; the (green) curve with the second-lowest cost at epoch 45 is for $s_g=s_\eta=1.050$; the (red) curve with the third-lowest cost at epoch 45 is for $s_g=s_\eta=1.075$; the (brown) curve with the fourth-lowest cost at epoch 45 is for $s_g=s_\eta=1.125$; the (orange) curve with the fifth-lowest cost at epoch 45 is for $s_g=s_\eta=1.025$; the (pink) curve with the sixth-lowest cost at epoch 45 is for $s_g=s_\eta=1.150$; the (blue) curve with the seventh-lowest cost at epoch 45 is for $s_g=s_\eta=1.000$; the (tan) curve with the second-highest cost at epoch 45 is for $s_g=s_\eta=1.200$; and the (gray) curve with the highest cost at epoch 45 is for $s_g=s_\eta=1.175$.
Figure 14:
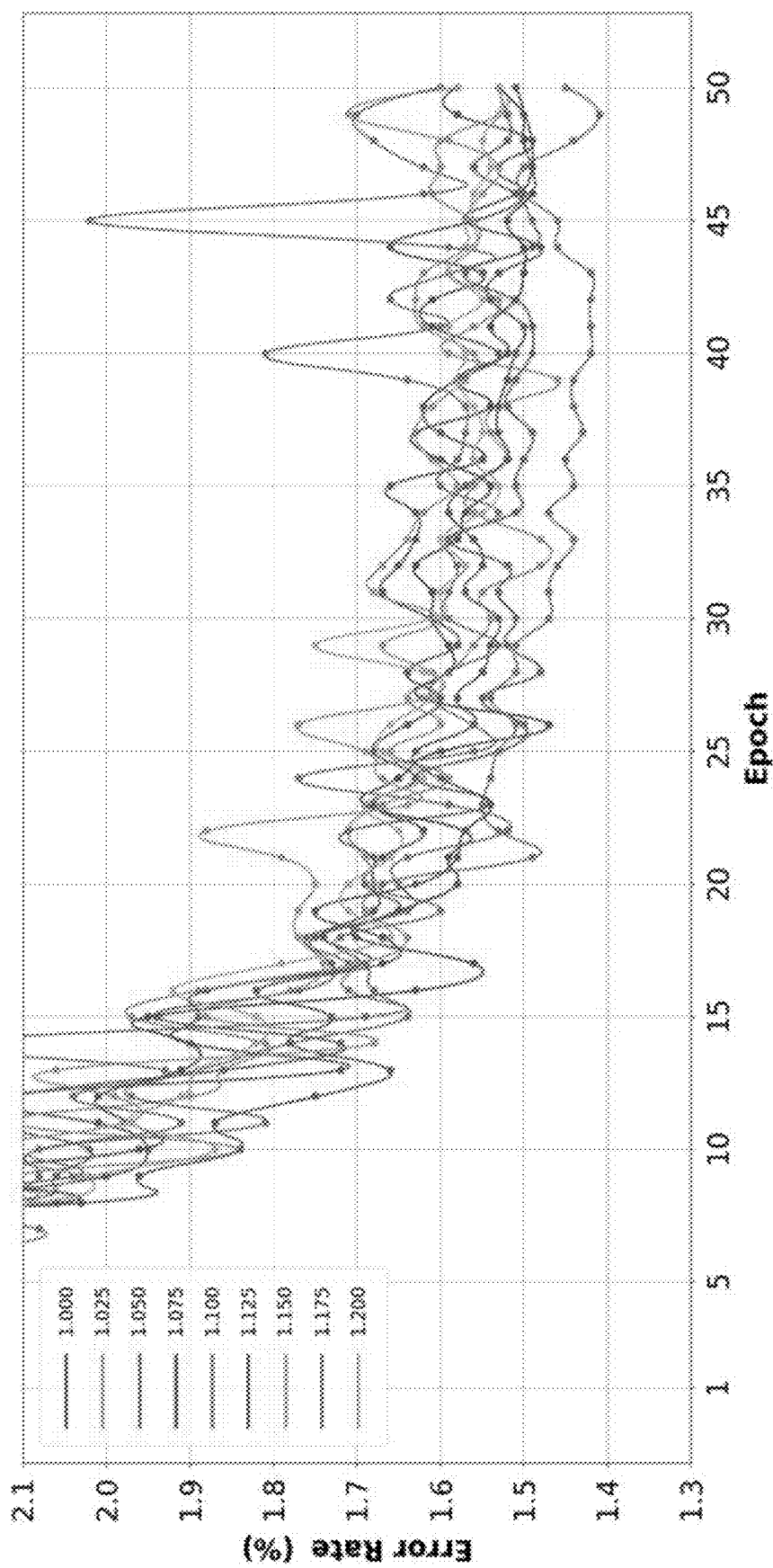
FIG. 14 shows a plot of error rate (in %) versus epoch, showing the minimal error rates with varied parameters (with each dot representing the error rate of the specific configuration on the corresponding epoch). The (purple) curve with the lowest error rate at epoch 40 is for $s_g=s_\eta=1.100$; the (green) curve with the second-lowest error rate at epoch 40 is for $s_g=s_\eta=1.050$; the (brown) curve with the third-lowest error rate at epoch 40 is for $s_g=s_\eta=1.125$; the (red) curve with the fourth-lowest error rate at epoch 40 is for $s_g=s_\eta=1.075$; the (blue) curve with the fifth-lowest error rate at epoch 40 is for $s_g=s_\eta=1.000$; the (pink) curve with the sixth-lowest error rate at epoch 40 is for $s_g=s_\eta=1.150$; the (tan) curve with the seventh-lowest error rate at epoch 40 is for $s_g=s_\eta=1.200$; the (orange) curve with the second-highest error rate at epoch 40 is for $s_g=s_\eta=1.025$; and the (gray) curve with the highest error rate at epoch 40 is for $s_g=s_\eta=1.175$.

In order to further verify that the lower value parameters for the current experiment provide for more reliable configurations, the varying trajectories of the cost and the error rate were examined across all of the tested parameters. As shown in FIG. 13 and FIG. 14, it was observed that there are three curves that generate prominent peaks and are associated with an unstable convergence process. Because all three of the peaks are a result of the largest three parameters (1.150, 1.175, and 1.200), it indicates that [1.100, 1.2000] is not a good section to obtain the optimal result. In contrast, all of the four curves resulting from [1.000, 1.100] represent a consistent stable optimization process. Therefore, there is a higher probability for AG-SGD to obtain the optimal result when the two parameters are in [1.000, 1.100]. The experiment results verify that the cost convergence become unstable if the two parameters go beyond the upper bound of the recommended CS (i.e., 1.156).

Example 3

There are 41 features and two classes (i.e., normal and anomaly) in the NSL-KDD dataset. All the 25192 instances in the file "KDDTrain+_20Percent" were selected as the training samples, and all the 22544 instances in the file "KDDTest+" were selected as the testing samples. In order to employ the logistic regression classifier on the data, the Principle Component Analysis (PCA) was applied to convert all the data to numeric (see Pei, Linear Principal Component discriminant analysis, IEEE International Conference on Systems, Man, and Cybernetics, Budapest, Hungary, January 2016; which is hereby incorporated by reference herein in its entirety). As a result, PCA generated 85 features in the training and testing sets. With respect to the configuration of the logistic regression classifier, there were four differences compared with the fully-connected Vanilla neural network. These were: (1) the numbers of input and output nodes were reduced to 85 and 2, respectively; (2) the cost function was changed to Cross-Entropy, which is more suitable for quantifying the output cost of binary classification problems than the MSE ([32] Keras, Probabilistic losses, [Online], Available: https://keras.io/api/losses/probabilistic_losses/#binarycrossentropy-class; which is hereby incorporated by reference herein in its entirety); (3) the number of epochs was limited to 30 due to the reduction in samples and complexity of classifier; and (4) the batch size was set to 1 to better reveal the difference in obtaining the optimal results among the 10 optimizers. Although a lower batch size will have a higher probability of making the SGD trajectory more chaotic and misleading the output cost to a higher value, a robust optimizer should result in a good result even though its batch size is 1. As a result, there were 755,760 gradients (i.e., (25,192/1)×30) that were generated to minimize the output cost in each experiment. For comparison, the lowest testing error rates achieved by the three neural networks are 20.7%, 19.87%, and 16.69%, respectively. The results of this experiment are shown in FIGS. 21, 22, 29, and 30.

Example 4

Referring to the pseudocode presented in FIG. 31, if the simple addition and multiplication are assumed to be O(1), the time complexity of the proposed optimization algorithm is bounded/determined according to the vector dot-product (i.e., $V_{PG} \cdot V_{CG}$) in Equation (1). Because the dot-product performs an element-wised multiplication between the two gradients, then the AG-SGD computational complexity is O(n), where n represents the length of the two vectors.

Figure 15:
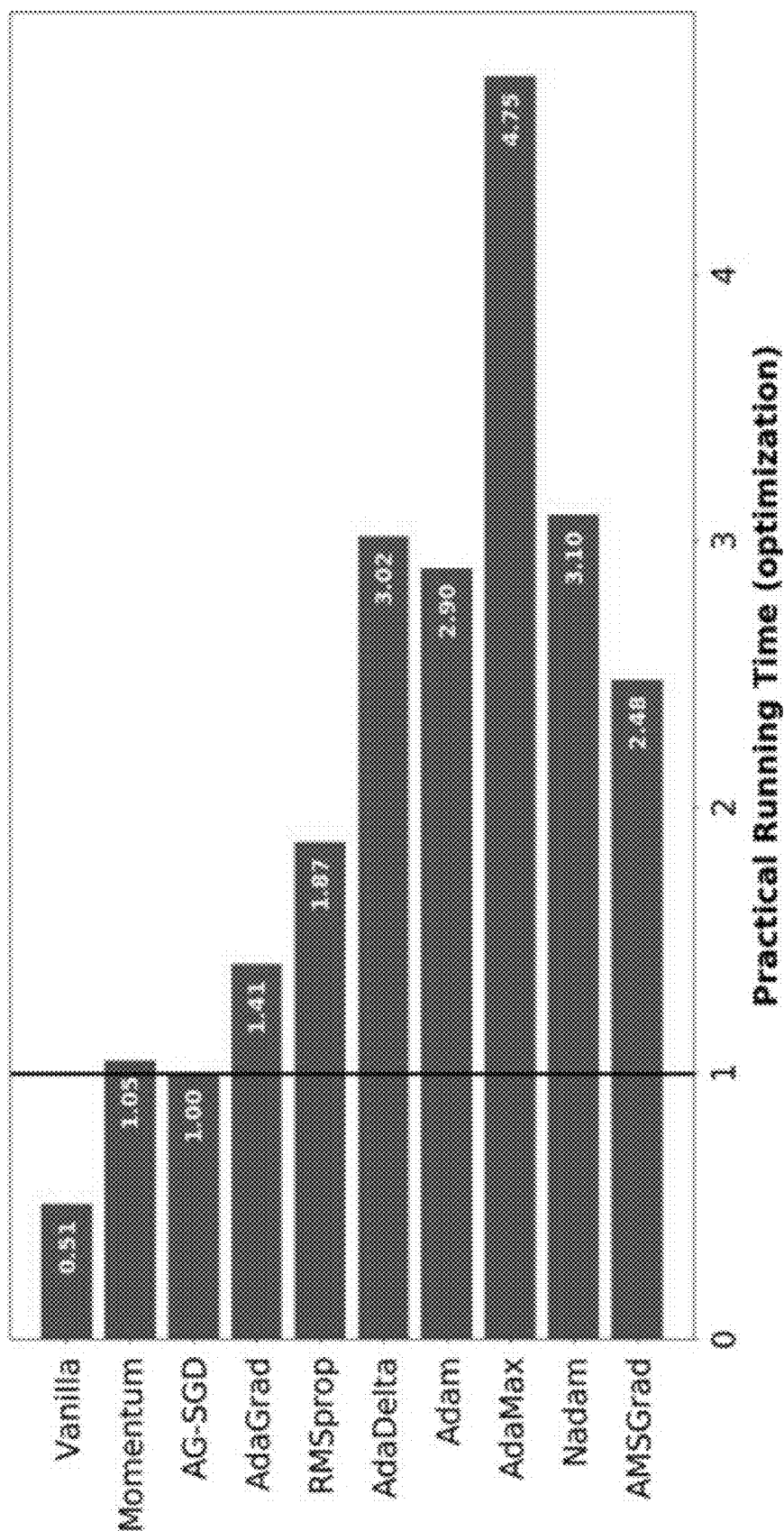
FIG. 15 shows a bar chart comparing practical running time (result from optimization procedure only) for different methods.

Because optimizers use the PG to calibrate the CG, they are associated with a minimum time complexity of O(n). This is due to the element-wised addition between the two gradients, making the use of the big O notation unusable for comparison purposes. Instead, to reveal the actual differences among the ten optimizes, their respective computational times were measured. Because the optimizers calculate their calibration terms sequentially, the practical time cost is determined by the number of computations with time complexities of O(n). As a result, the running or execution times for each of the ten optimizers were measured, as shown in FIG. 15. Because the training task exhausts all the available computation resources, the temperature of hardware (i.e., CPU/GPU) will be increased, which impacts optimization efficiency. Further, if the 10 optimizers were orderly tested (OT), an early-tested optimizer will take the advantage of a more powerful/cooler hardware. In order to avoid this bias impacting the results, the OT was performed three times, consecutively. Then, the result of each optimizer was averaged from its three sub-results. Particularly, if one of the sub-results deviated from the other two sub-results by 15% or more, it was discarded (i.e., assume to be affected by the performance decreasing due to the high temperature) and new tests were conducted until the deviation was less than 15%. In order to better compare the time costs between AG-SGD and the other optimizers, each averaged running time was divided by the result of AG-SGD. For example, AdaGrad was slower than AG-SGD by 41% (i.e., (1.41−1.00)/1.00=0.41/1.00=0.41) in practice. It is evident that Vanilla is always the fastest because it does not compute any calibration term and solely updates the mode parameters by the CG. With respect to the other nine optimizers, AG-SGD has a significant advantage in practical time cost.

Figure 16:
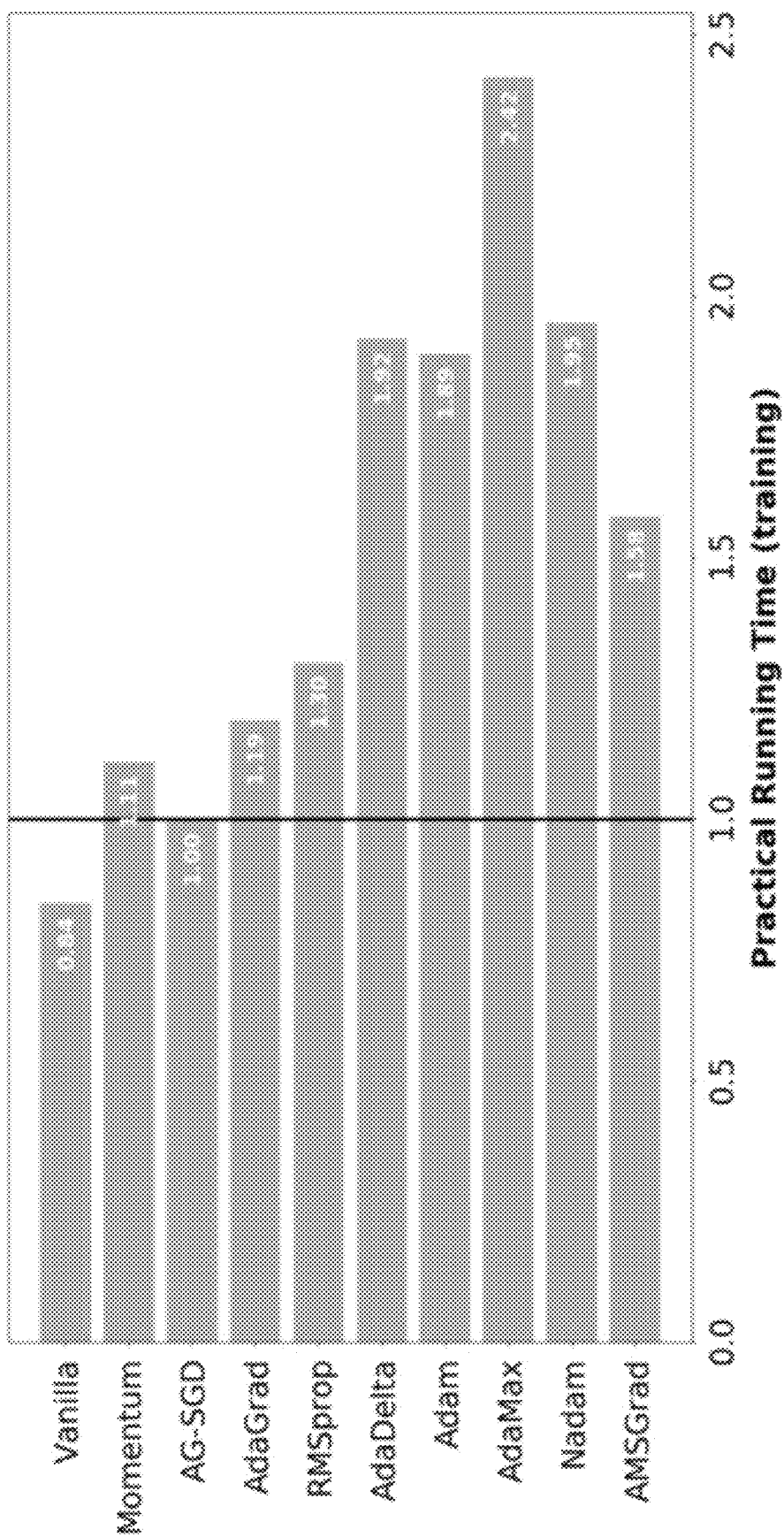
FIG. 16 shows a bar chart comparing practical running time (result from all procedures of model training) for different methods.

However, the advantage in optimization efficiency does not fully translate into an advantage in training efficiency because the former is a subset of the latter. More specifically, because the time costs of the procedures other than optimization (e.g., backpropagation) are constant among all the optimizers, it can be expected that the differences in training efficiency will be smaller than the differences in optimization efficiency, which was verified by the results shown in FIG. 16. Although the advantages achieved by AG-SGD are less, it was still the most efficient optimizer (i.e., only slower than Vanilla by 19%=(1.00−0.84)/0.84). This means that a more complex neural network can be trained employing AG-SGD, achieving higher accuracies.

Example 5

AG-SGD attempts to reduce the cost in one step by reversing the PG (when needed), leading to a lower number of obtuse angles among the other SGD optimizers. Because the lower bound of the CS is 120° under the default configuration, the PG revision will occur only when the angle is larger than 120°. In order to verify the effectiveness of angle reduction in the default CS, the numbers of angles in [120°, 170°) were counted and compared for all of the ten optimizers in the experiment on the MNIST dataset (note: [170°, 180°] was eliminated because no optimizer generates an angle in this section). As the data in FIG. 27 indicate, AG-SGD had the least number of obtuse angles in all of the sections. Particularly, it had less than the second-least optimizer (i.e., AMSGrad) by 42.14%=(9371−5422)/9371, and considering the averages of all other optimizer by 54.17%= (11830−5422)/11830 in total. Therefore, the AG-SGD spends less steps on the high cost areas among the ten optimizers, and the saved steps are used to find better minima.

In order to check the relationship between the number of obtuse angles and the associated results (i.e., cost and error rate), the correlation coefficients were computed for all of the ten optimizers, as shown in FIG. 28. Because the principle of SGD is to indirectly reduce the error rate via directly reducing the cost, the correlation coefficient associated with the cost reduction (i.e., closing to 0.8 in FIG. 28) indicated a strong positive correlation between the two metrics. Therefore, reversing the PG when needed is an effective method and the angle between the gradients is a reliable metric in reducing the cost.

Example 6

Figure 17:
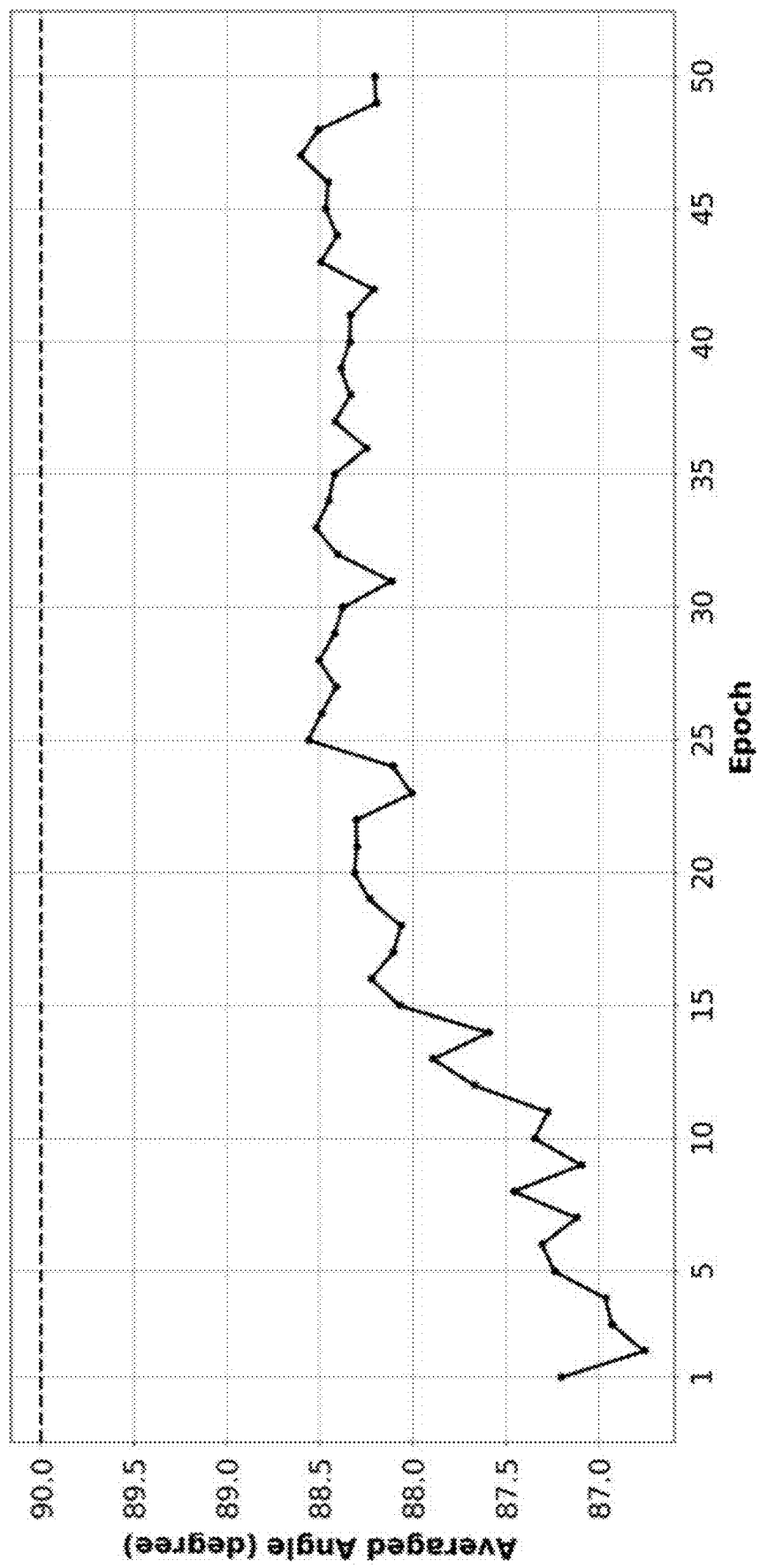
FIG. 17 shows a plot of averaged angle (in degrees) between consecutive gradients of each epoch versus epoch (each dot denotes the averaged angles within the epoch).
Figure 18:
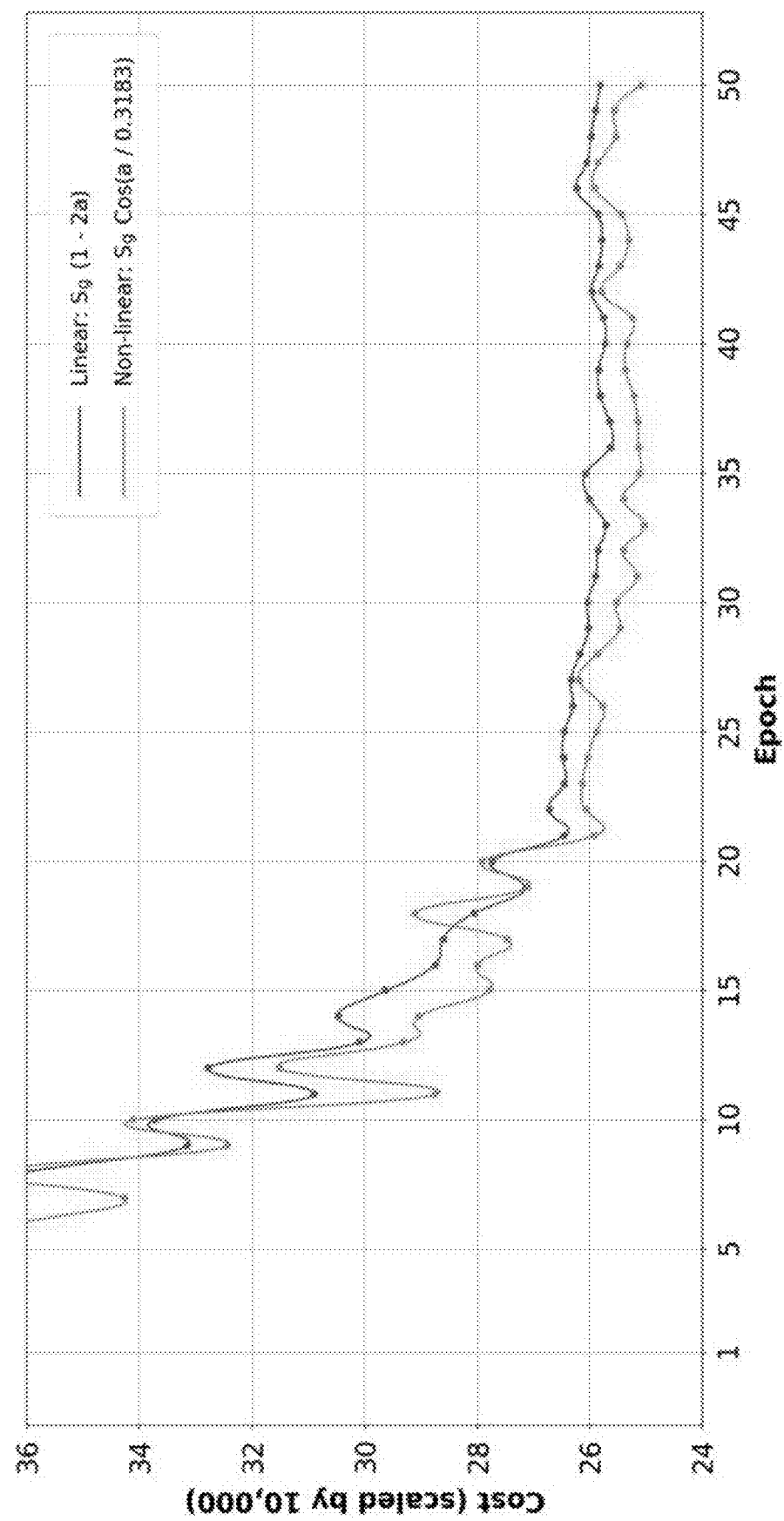
FIG. 18 shows a plot of cost (scaled by 10,000) versus epoch, showing a comparison of convergence speeds between linear (original) and non-linear definitions of $F_{pg}$ $(a, s_g)$. The (blue) curve with the highest cost at epoch 40 is for linear $s_g$ (1−2a); and the (orange) curve with the lowest cost at epoch 40 is for non-linear $s_g(\cos(a/0.3183))$.

AG-SGD did not show the best converging speed in the first 14 epochs. In order to determine the reason, the averaged angles between the gradients of all the 50 epochs were computed. Referring to FIG. 17, the angles during the first 14 epochs are distinctly smaller than the other epochs, which means more acute angles are generated during earlier epochs. Because the magnitude of the NG variance decreases rapidly as the angle approaches 0° (refer to FIG. 4), it is expected that the convergence can be accelerated by replacing the simplistic linear line $L_0$ of $F_{pg}(a,s_g)$ with other definitions with higher slopes, such as the curves $C_1, C_2, C_3$ in FIG. 2 and FIG. 3. In order to verify the feasibility of this solution, a non-linear definition $s_g \cos(a/0.3183)$ of $F_{pg}(a,s_g)$ was tested (setting 0.3183 such that the curve crosses the x-axis at 0.5). The results presented in FIG. 18 indicate that the convergence speed effects from the non-linear definition are consistently faster than those from the linear ones. The distinction begins to manifest as of epoch 11 (except for epochs 18 and 20), which is in line with the expectation.

Figure 19:
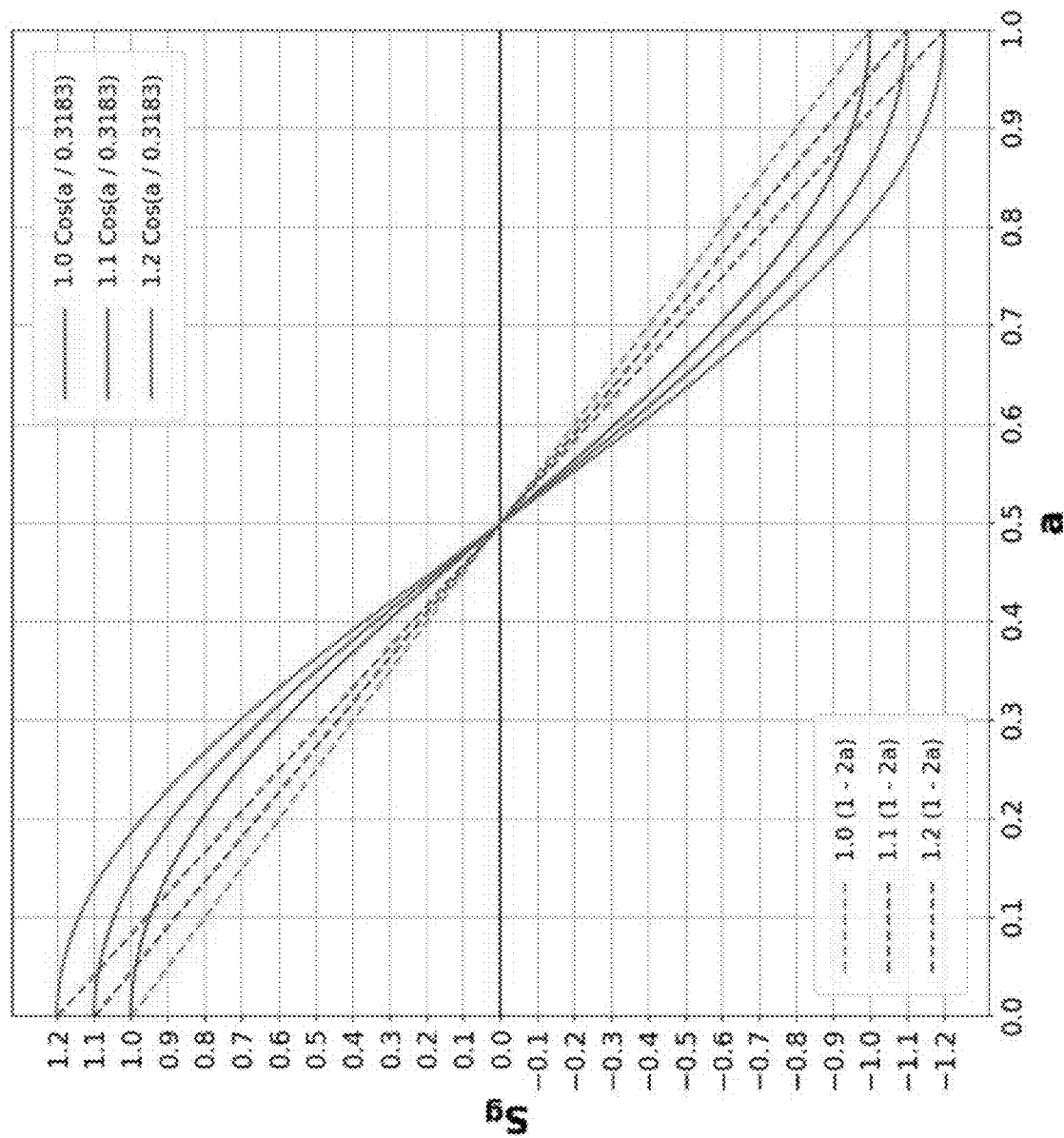
FIG. 19 shows a plot of $s_g$ versus a, showing a relationship among some representative linear and non-linear definitions of $F_{pg}(a,s_g)$ ($s_g \in [1.0, 1.2]$, step by 0.1). The (purple) curve with the lowest value of $s_g$ at a=0.8 is for $1.2(\cos(a/0.3183))$; the (green) curve with the second-lowest value of $s_g$ at a=0.8 is for $1.1(\cos(a/0.3183))$; the (blue) curve with the third-lowest value of $s_g$ at a=0.8 is for $1.0(\cos(a/0.3183))$; the (brown) dotted line with the third-highest value of $s_g$ at a=0.8 is for 1.2(1−2a); the (red) dotted line with the second-highest value of $s_g$ at a=0.8 is for 1.1(1−2a); and the (orange) dotted line with the highest value of $s_g$ at a=0.8 is for 1.0(1−2a).

In addition, employing a non-linear definition does not increase the number of parameters. For example, $s_g$ is the only parameter that exists in both the non-linear (i.e., $s_g \cos(a/0.3183)$) and linear (i.e., $s_g(1−2a)$) definitions, as shown in the curves and lines in FIG. 19 (i.e., when $s_g \in [1.0, 1.2]$, step by 0.1). If one/two functions (i.e., $F_{pg}(a,s_g)$ and $F_n(a,s_n)$) of AG-SGD is/are modified, a new optimizer with two parameters (i.e., $s_g$ and $s_n$) is obtained (i.e., function modification should not be considered equivalent to parameter tuning). Compared with the Adam family, which consists of two optimizers, the AG-SGD-family is able to generate numerous new optimizers by defining various definitions. The four requirements of defining qualified alternatives are presented above.

Example 7

Figure 20:
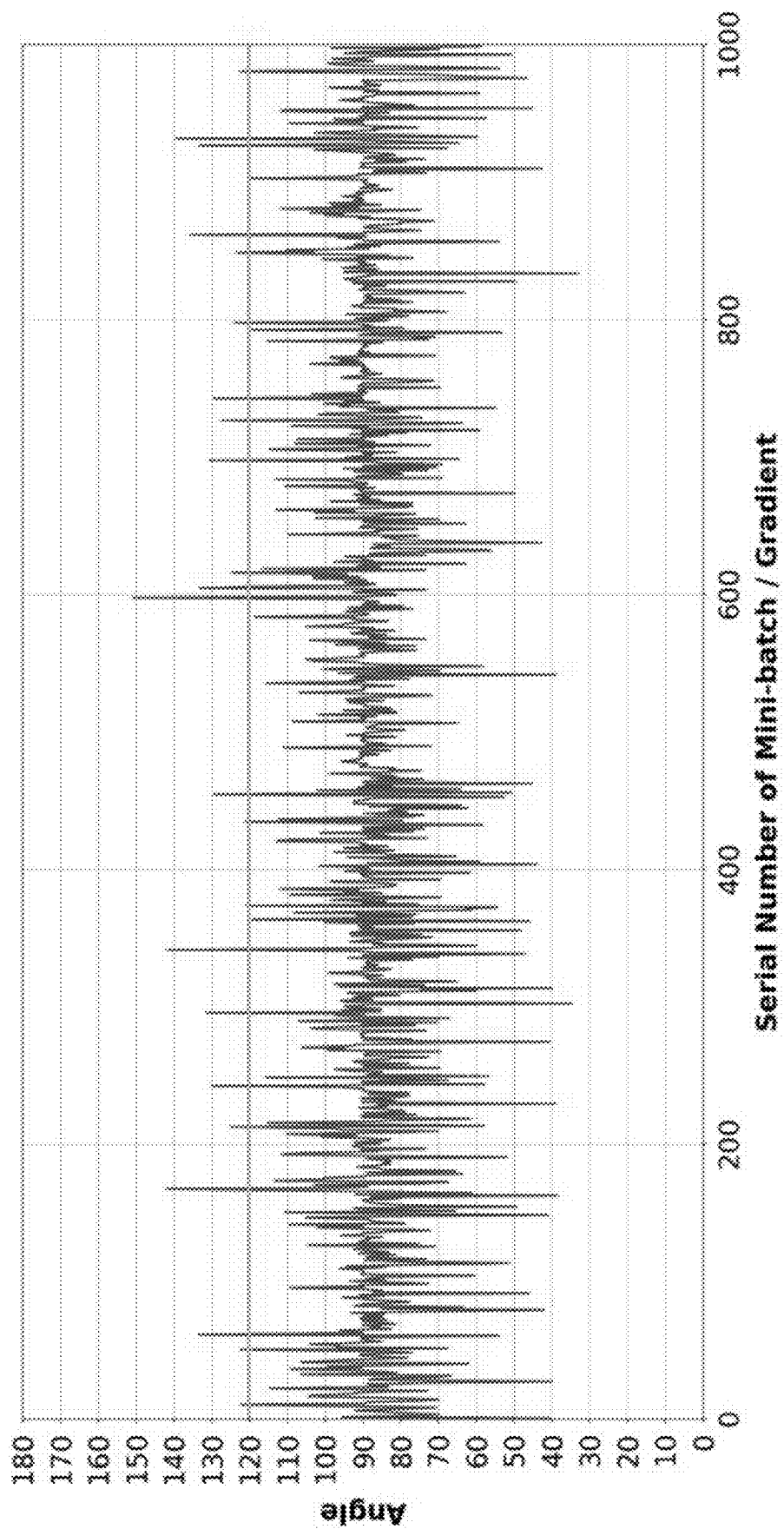
FIG. 20 shows a plot of angle (in degrees) versus serial number of min-batch/gradient, showing a trajectory of the first 1,000 angles under a default setting (results from the experiment on MNIST; only 24 of 1,000 are larger than 120°).
Figure 21:
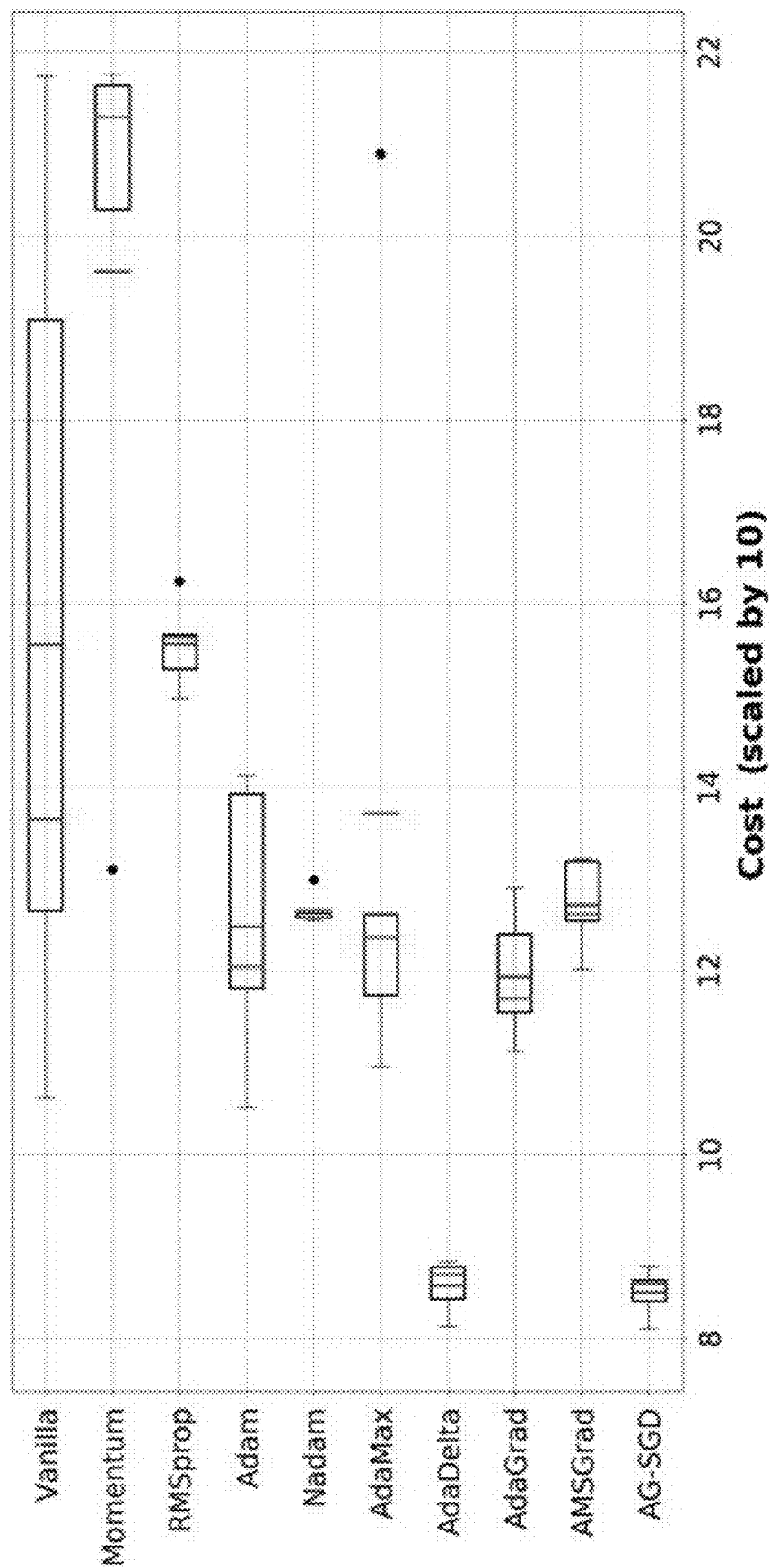
FIG. 21 shows a plot of distributions of the five minimal costs (scaled by 10) on the NSL-KDD dataset; black dots are outliers.
Figure 22:
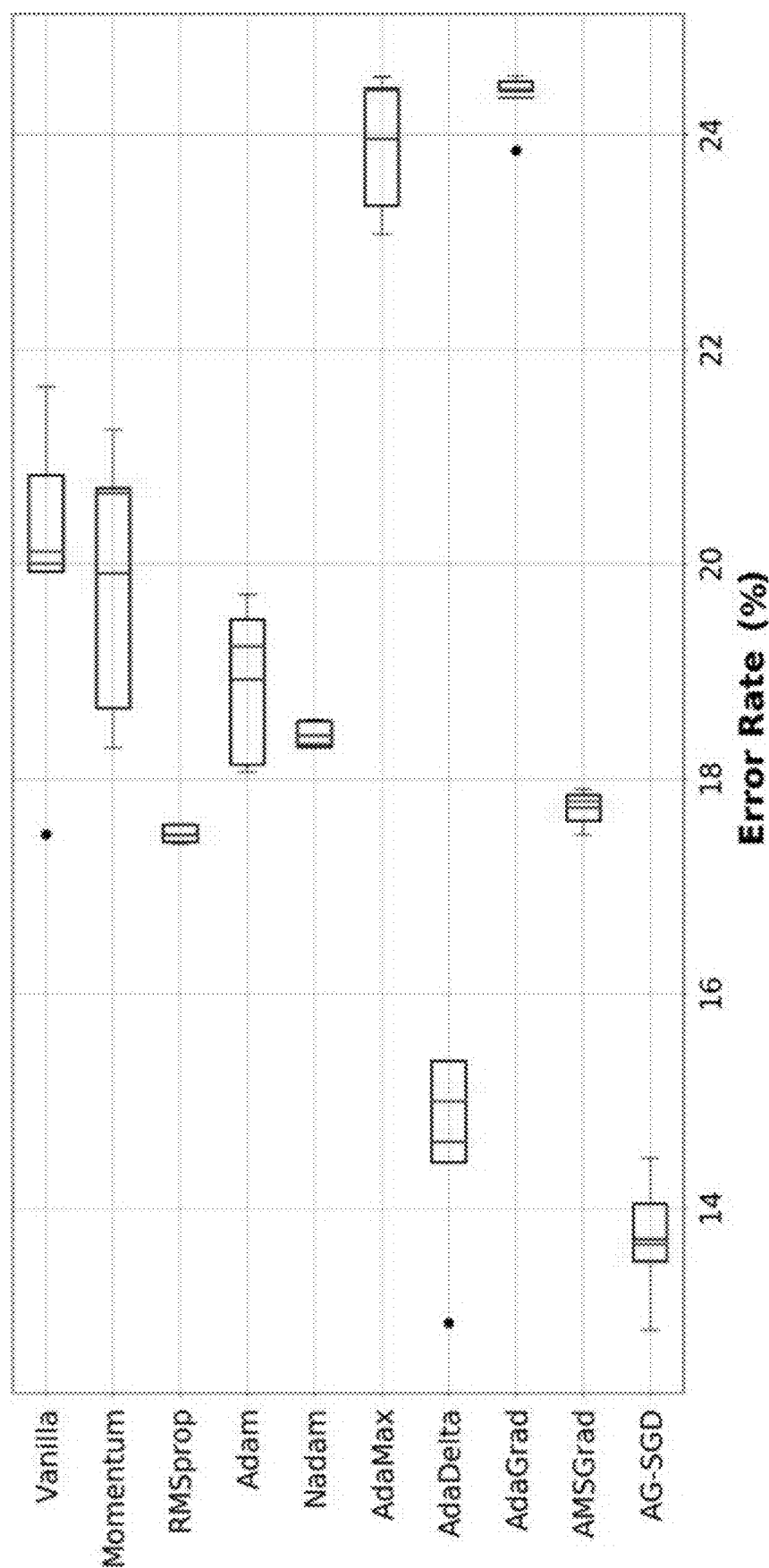
FIG. 22 shows a plot of distributions of the five minimal error rates (in %) on the NSL-KDD dataset; black dots are outliers.

Another potential issue that AG-SGD may have is its cost trapping into bad local minima. This problem may occur in principle when the NGs are consecutively reduced due to multiple obtuse angles (e.g., θ∈(120°, 180°) under the default setting). In order to verify that the NGs will not diminish in practice, the changing trajectory of the first 1,000 angles was recorded under the default setting (results from the experiment on the MNIST dataset), as shown in FIG. 20. The findings indicate that only 24 of 1,000 (2.4%) of the angles are larger than 120° and that there are no consecutive large angles. If these large angles result from local minima, the data prove that the AG-SGD can achieve escaping from these local minima in only one step (i.e., no consecutive larger angle). In line with an established principle, when a large angle (>120° under the default setting) is generated, $w_{pg}$ will be less than zero and makes the PG point in the direction that deviates from the bad minimum (refer to FIG. 2). Although the CG may point to the bad minimum and $w_{cg}$ is slightly larger than the $|w_{pg}|$ (i.e., only when the η∈(120°, 135°)), the accumulated PGs will be much larger than the single CG in magnitude. As a result, the NG (i.e., η($w_{pg}$PG+$w_{cg}$CG)) aligns in direction with the PG which forces the cost deviating from the bad minimum (i.e., moving backward).

Learning rate schedulers (e.g., annealing/decay and warm restarts) may combine with AG-SGD to further reduce the cost. Based on the experiments on the MNIST, if the learning rate is decayed, the lowest, average, and stability of the cost can be improved. However, the traditional/tested learning rate scheduler is incompatible/conflicted with the AG-SGD, because it adjusts the learning rate based on epoch instead of the angle. Therefore, an angle-based learning rate method can be used instead to improve the results of AG-SGD.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for optimizing an objective function using a stochastic gradient descent (SGD) approach, the objective function being part of a machine learning (ML) model that comprises at least one of a deep learning model, a neural network, and a logistic regression, the system comprising:
   a processor;
   a memory in operable communication with the processor; and
   a machine-readable medium in operable communication with the processor and the memory, the machine-readable medium having instructions stored thereon that, when executed by the processor, perform the following steps:
   performing a SGD process on the objective function, in which a new gradient (NG) is determined at each epoch of the SGD process;
   determining, at each epoch, an inner angle (θ) between a previous gradient (PG) and a current gradient (CG);
   adjusting, at each epoch, a weight ($w_{pg}$) of the PG and a weight ($w_{cg}$) of the CG based on the inner angle (θ) to give a weighted PG and a weighted CG;
   computing, at each epoch, a learning rate (η) based on the weighted PG and the weighted CG;
   computing, at each epoch, the NG for the respective epoch by combining the weighted PG and the weighted CG and multiplying the result by the learning rate, thereby optimizing the objective function; and
   training the ML model using the optimized objective function,
   the learning rate and the NG for each epoch being stored on at least one of the memory and the machine-readable medium,
   the optimizing of the objective function improving the system by minimizing computing resource costs of the system, and
   the use of the optimized objective function reducing an amount of time required for the training of the ML model and improving an accuracy of the ML model.

2. The system according to claim 1, the determining of the inner angle (θ) comprising calculating the inner angle (θ) using Equation (1):

$$\theta = \arccos((V_{PG} \cdot V_{CG})/(|V_{PG}||V_{CG}|))(180/\pi) \quad (1)$$

where $V_{PG}$ is a vector of the PG and $V_{CG}$ is a vector of the CG, and $V_{PG} \cdot V_{CG}$ is a vector dot product of $V_{PG}$ and $V_{CG}$.

3. The system according to claim 1, the instructions when executed by the processor further performing the following steps:
   if the inner angle (θ) is less than 90° at an epoch, setting the PG to be equal to an original past gradient before computing the NG for that respective epoch;
   if the inner angle (θ) is greater than 90° at an epoch, reversing a direction of the PG before computing the NG for that respective epoch; and
   if the inner angle (θ) is equal to 90° at an epoch, adjusting the weighted PG to zero before computing the NG for that respective epoch.

4. The system according to claim 1, the adjusting of the weight of the PG and the weight of the CG comprising:
   if the inner angle (θ) moves closer to 0° or 180° than it was in a most recent previous epoch, increasing a ratio of the weight of the PG to the weight of the CG ($w_{pg}/w_{cg}$); and
   if the inner angle (θ) moves closer to 90° than it was in a most recent previous epoch, decreasing the ratio of the weight of the PG to the weight of the CG ($w_{pg}/w_{cg}$).

5. The system according to claim 1, the adjusting of the weight of the PG and the weight of the CG comprising setting and utilizing a first parameter ($s_g$) that contributes to controlling a magnitude of NG, and
   the computing of the learning rate (η) comprising setting and utilizing a second parameter ($s_\eta$) that is a lower bound of the learning rate (η).

6. The system according to claim 5, the first parameter ($s_g$) having a value that is greater than 0.820 and less than 1.156.

7. The system according to claim 5, the second parameter ($s_\eta$) having a value that is greater than 0.820 and less than 1.156.

8. A method for optimizing objective functions using a stochastic gradient descent (SGD) approach, the objective function being part of a machine learning (ML) model that comprises at least one of a deep learning model, a neural network, and a logistic regression, the method comprising:
   performing, by a processor in operable communication with a memory and a machine-readable medium of a system, a SGD process on the objective function, in which a new gradient (NG) is determined at each epoch of the SGD process;

determining, by the processor, at each epoch, an inner angle (θ) between a previous gradient (PG) and a current gradient (CG);

adjusting, by the processor, at each epoch, a weight ($w_{pg}$) of the PG and a weight ($w_{cg}$) of the CG based on the inner angle (θ) to give a weighted PG and a weighted CG;

computing, by the processor, at each epoch, a learning rate (η) based on the weighted PG and the weighted CG;

computing, by the processor, at each epoch, the NG for the respective epoch by combining the weighted PG and the weighted CG and multiplying the result by the learning rate, thereby optimizing the objective function, and training, by the processor, the ML model using the optimized objective function, the learning rate and the NG for each epoch being stored on at least one of the memory and the machine-readable medium, the optimizing of the objective function improving the system by minimizing computing resource costs of the system, and the use of the optimized objective function reducing an amount of time required for the training of the ML model and improving an accuracy of the ML model.

9. The method according to claim 8, the determining of the inner angle (θ) comprising calculating the inner angle (θ) using Equation (1):

$$\theta = \arccos((V_{PG} \cdot V_{CG})/(|V_{PG}||V_{CG}|))(180/\pi) \quad (1)$$

where $V_{PG}$ is a vector of the PG and $V_{CG}$ is a vector of the CG, and $V_{PG} \cdot V_{CG}$ is a vector dot product of $V_{PG}$ and $V_{CG}$.

10. The method according to claim 8, further comprising:
if the inner angle (θ) is less than 90° at an epoch, setting the PG to be equal to an original past gradient before computing the NG for that respective epoch;
if the inner angle (θ) is greater than 90° at an epoch, reversing a direction of the PG before computing the NG for that respective epoch; and
if the inner angle (θ) is equal to 90° at an epoch, adjusting the weighted PG to zero before computing the NG for that respective epoch.

11. The method according to claim 8, the adjusting of the weight of the PG and the weight of the CG comprising:
if the inner angle (θ) moves closer to 0° or 180° than it was in a most recent previous epoch, increasing a ratio of the weight of the PG to the weight of the CG ($w_{pg}/w_{cg}$); and
if the inner angle (θ) moves closer to 90° than it was in a most recent previous epoch, decreasing the ratio of the weight of the PG to the weight of the CG ($w_{pg}/w_{cg}$).

12. The method according to claim 8, the adjusting of the weight of the PG and the weight of the CG comprising setting and utilizing a first parameter ($s_g$) that contributes to controlling a magnitude of NG, and
the computing of the learning rate (η) comprising setting and utilizing a second parameter ($s_\eta$) that is a lower bound of the learning rate (η).

13. The method according to claim 12, the first parameter ($s_g$) having a value that is greater than 0.820 and less than 1.156, and
the second parameter ($s_\eta$) having a value that is greater than 0.820 and less than 1.156.

14. A system for optimizing an objective function using a stochastic gradient descent (SGD) approach, the objective function being part of a machine learning (ML) model that is a neural network or a logistic regression, the system comprising:

a processor;

a memory in operable communication with the processor; and a machine-readable medium in operable communication with the processor and the memory, the machine-readable medium having instructions stored thereon that, when executed by the processor, perform the following steps:

performing a SGD process on the objective function, in which a new gradient (NG) is determined at each epoch of the SGD process;

determining, at each epoch, an inner angle (θ) between a previous gradient (PG) and a current gradient (CG);

adjusting, at each epoch, a weight ($w_{pg}$) of the PG and a weight ($w_{cg}$) of the CG based on the inner angle (θ) to give a weighted PG and a weighted CG;

computing, at each epoch, a learning rate (η) based on the weighted PG and the weighted CG;

computing, at each epoch, the NG for the respective epoch by combining the weighted PG and the weighted CG and multiplying the result by the learning rate, thereby optimizing the objective function; and training the ML model using the optimized objective function, the learning rate and the NG for each epoch being stored on at least one of the memory and the machine-readable medium, and the optimizing of the objective function improving the system by minimizing computing resource costs of the system, the use of the optimized objective function reducing an amount of time required for the training of the ML model and improving an accuracy of the ML model, the determining of the inner angle (θ) comprising calculating the inner angle (θ) using Equation (1):

$$\theta = \arccos((V_{PG} \cdot V_{CG})/(|V_{PG}||V_{CG}|))(180/\pi) \quad (1)$$

where $V_{PG}$ is a vector of the PG and $V_{CG}$ is a vector of the CG, and $V_{PG} \cdot V_{CG}$ is a vector dot product of $V_{PG}$ and $V_{CG}$, the instructions when executed by the processor further performing the following steps:

if the inner angle (θ) is less than 90° at an epoch, setting the PG to be equal to an original past gradient before computing the NG for that respective epoch;

if the inner angle (θ) is greater than 90° at an epoch, reversing a direction of the PG before computing the NG for that respective epoch; and if the inner angle (θ) is equal to 90° at an epoch, adjusting the weighted PG to zero before computing the NG for that respective epoch, the adjusting of the weight of the PG and the weight of the CG comprising:

if the inner angle (θ) moves closer to 0° or 180° than it was in a most recent previous epoch, increasing a ratio of the weight of the PG to the weight of the CG ($w_{pg}/w_{cg}$); and if the inner angle (θ) moves closer to 90° than it was in a most recent previous epoch, decreasing the ratio of the weight of the PG to the weight of the CG ($w_{pg}/w_{cg}$), the adjusting of the weight of the PG and the weight of the CG comprising setting and utilizing a first parameter ($s_g$) that contributes to controlling a magnitude of NG, the computing of the learning rate ($\eta$) comprising setting and utilizing a second parameter ($s_\eta$) that is a lower bound of the learning rate ($\eta$), the first parameter ($s_g$) having a value that is greater than 0.820 and less than 1.156, and the second parameter ($s_\eta$) having a value that is greater than 0.820 and less than 1.156.

* * * * *